(12) United States Patent
Sera et al.

(10) Patent No.: US 7,714,081 B2
(45) Date of Patent: May 11, 2010

(54) HEAT-STORAGE MATERIAL COMPOSITION

(75) Inventors: Masanori Sera, Ichihara (JP); Yutaka Minami, Ichihara (JP); Takenori Fujimura, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 428 days.

(21) Appl. No.: 10/577,496

(22) PCT Filed: Oct. 27, 2004

(86) PCT No.: PCT/JP2004/015923

§ 371 (c)(1),
(2), (4) Date: Apr. 27, 2006

(87) PCT Pub. No.: WO2005/040300

PCT Pub. Date: May 6, 2005

(65) Prior Publication Data

US 2007/0079825 A1    Apr. 12, 2007

(30) Foreign Application Priority Data

Oct. 29, 2003    (JP) .............................. 2003-368606

(51) Int. Cl.
*C08L 23/00* (2006.01)
*C08L 23/02* (2006.01)
(52) U.S. Cl. ...................... 525/500; 524/500
(58) Field of Classification Search ................. 525/191; 524/500
See application file for complete search history.

(56) References Cited

U.S. PATENT DOCUMENTS

| | | | |
|---|---|---|---|
| 5,718,835 A | * | 2/1998 | Momose et al. ............... 252/73 |
| 6,054,198 A | | 4/2000 | Bunyan et al. |
| 7,019,091 B2 | * | 3/2006 | Minami et al. ............... 526/160 |
| 7,109,283 B2 | * | 9/2006 | Minami et al. ............ 526/348.3 |
| 2007/0088124 A1 | * | 4/2007 | Sera et al. ...................... 525/55 |

FOREIGN PATENT DOCUMENTS

| | | |
|---|---|---|
| JP | 05-098247 | 4/1993 |
| JP | 05-214328 | 8/1993 |
| JP | 6-65446 | 3/1994 |
| JP | 2 826 768 | 11/1998 |
| JP | 2004-161885 | 6/2004 |
| WO | 03/070790 | 8/2003 |
| WO | 03/087218 | 10/2003 |

OTHER PUBLICATIONS

Database WPI Week 199414, Derwent publication Lts., London, CB, An 1994-115313 XP-002480324, JP 06 065446, Mar. 8, 1994 (abstract).

* cited by examiner

*Primary Examiner*—Nathan M Nutter
(74) *Attorney, Agent, or Firm*—Oblon, Spivak, McClelland, Maier & Neustadt, L.L.P.

(57) ABSTRACT

The present invention relates to a heat storage material composition comprising 20 to 100% by weight of a heat storage material, 80 to 0% by weight of crystalline polyolefin (B) and 50 to 0% by weight of an elastomer (C), and the heat storage material described above contains a side chain-crystalline polymer (A), wherein the heat storage material described above comprises preferably a higher α-olefin polymer (a) containing 50 mole % or more of higher α-olefin having 10 or more carbon atoms and a petroleum wax (b) in which a melting point (Tm) is higher by 10° C. or more than that of the polymer (a). Provided is a heat storage material composition which has less bleeding and stickiness and is excellent in stability at high temperature and which can meet a change in temperature such as a difference in room temperature when applied to a material for floor heating and can avoid a heating state deviated to high temperature or low temperature.

8 Claims, No Drawings

HEAT-STORAGE MATERIAL COMPOSITION

BACKGROUND OF THE INVENTION

The present invention relates to a heat storage material composition, specifically to a heat storage material composition which has less bleeding and stickiness and is excellent in stability at high temperature. The present invention can also meet a change in temperature such as a difference in room temperature when applied to a material for floor heating and can avoid a heating state deviated to high temperature or low temperature.

BACKGROUND ART

A heat storage material includes those materials that make use of latent heat, phase change latent heat and chemical reaction heat.

Among said exemplary heat storage materials, the heat storage materials making use of latent heat are preferable.

In particular, the heat storage materials can be applied to heat storage type air-conditioning equipment, heat storage type building materials and various heat insulating instruments and equipment making use of a heat amount discharged in transition from a liquid phase to a solid phase.

Further, the heat storage materials can be used for cold insulating agents making use of a phenomenon in which heat is absorbed in transition from a solid phase to a liquid phase.

In the above case, the objects can be achieved by setting a transition temperature (melting point) of heat storage agents used to a targeted temperature, for example, the vicinity of room temperature and the vicinity of body temperature.

Among the heat storage agents, particularly organic heat storage materials such as paraffin, are latent heat storage materials that make use of latent heat involved in phase transition between a solid phase and a liquid phase, and have excellent long term life.

Such latent heat storage materials that make use of the phase transition between a solid phase and a liquid phase are required to give consideration to prevention from flowing and leaking when they are liquefied by the phase transition.

Accordingly, the following methods are known: a method in which they are received in a hermetically sealed vessel or bag, a method in which they are received in a porous substance, a method in which they are microencapsulated, a method in which they are received in polyolefin and shut in capsules and a method in which they are kneaded into crystalline polyolefin such as crystalline polyethylene (for example, see patent document 1 and patent document 2).

However, in the respective methods described above, vessels having a satisfactory strength have to be used; production processes are complicated, and the cost is therefore increased; and paraffin can not completely be prevented from bleeding and therefore results in a large problem.

Bleeding is caused since paraffin having a low molecular weight is used for a heat storage material, and it is considered to be unavoidable from the viewpoint of a molecular mobility.

In particular, paraffins having a melting point falling in the vicinity of room temperature and body temperature are used in many cases for paraffins of a low molecular weight used for a heat storage material, and large amounts of low melting components (sticky components and bleeding components) having a low molecular weight are contained therein.

However, as uses of a heat storage material have expanded in recent years, heat storage materials having less bleeding of organic heat storage materials are required.

Further, when low molecular weight materials such as paraffin are used for a heat storage material, components which are vaporized when exposed to high temperature during kneading and extruding are contained therein and have brought about processing problems.

Side chain-crystalline polymers have been investigated as a temperature-sensitive adhesive (for example, see patent document 3).

However, possibility of the polymers used above as a heat storage material is not described therein.

Further, the side chain-crystalline polymers are mainly acryl bases. When they are blended with olefin base resins such as crystalline polyolefins, an effect of shutting in the olefin base resins is small because of a low compatibility of acryl base polymers, and bleeding is a concern.

Further, it is described that dodecene polymers only found in the examples are polymerized by a non-metallocene catalyst, so that molecular weight distribution is broad, and a melting peak width is broad.

Further, it has a low melting calorie of 28 J/g and is not suited to be a heat storage material in which sharp melting and crystallization and a large heat capacity are required.

In uses such as floor heating, there is the problem that it is less liable to meet a difference in temperature such as a difference in room temperature.

That is, in a warm time zone in daytime and a low temperature time zone before dawn, it is desired to give variety to heating temperature. In conventional heat storage materials, however, heat releasing temperature is fixed as average temperature in daytime, and therefore it is difficult to deal with a difference in temperature, so that either room temperature has been elevated too high or has not gone up to required temperature.

Patent document 1: Japanese Patent No. 2852532

Patent document 2: Japanese Patent Application Laid-Open No. 27460/1996

Patent document 3: Japanese Patent No. 3333140

DISCLOSURE OF THE INVENTION

The present invention has been made in order to solve the problems described above, and an object thereof is to provide a heat storage material composition which has less bleeding and stickiness and is excellent in stability at high temperature and which can meet a change in temperature such as a difference in room temperature when applied to materials for floor heating and can avoid a heating state deviated to high temperature or low temperature.

Intensive research by the present inventors in order to achieve the object described above has resulted in finding that the object described above can be achieved by using a high polymer of a side chain-crystalline type for a heat storage material. Thus, they have completed the present invention.

That is, the present invention provides:

1. a heat storage material composition comprising 20 to 100% by weight of a heat storage material, 80 to 0% by weight of a crystalline polyolefin (B) and 50 to 0% by weight of an elastomer (C), and the heat storage material described above contains a side chain-crystalline polymer (A), 2. the heat storage material composition as described in the above item 1, wherein the side chain-crystalline polymer (A) is a higher α-olefin polymer (a) containing 50 mole % or more of α-olefin having 10 or more carbon atoms, 3. the heat storage material composition as described in the above item 1, wherein the heat storage material described above comprises the higher α-olefin polymer (a) containing 50 mole % or more of higher α-olefin having 10 or more carbon atoms and a petroleum wax (b) in which a melting point (Tm) is higher by 10° C. or more than that of the polymer (a), 4. the heat storage material composition as described in the above item 2 or 3, wherein the higher α-olefin polymer (a) satisfies the following (1) to (3):

(1) a stereospecific index value M2 (mole %) is 50 mole % or more, (2) a weight average molecular weight (Mw) reduced to polystyrene which is measured by gel permeation chromatograph (GPC) is 1,000 to 10,000,000, and a molecular weight distribution (Mw/Mn) is 1.2 to 4.0 and (3) a peak observed from a melting endothermic curve obtained by maintaining the above polymer at 190° C. for 5 minutes under nitrogen atmosphere by means of a differential scanning type calorimeter (DSC), then cooling down to −30° C. at 5° C./minute, maintaining at −30° C. for 5 minutes and then heating up to 190° C. at 10° C./minute is single, and a melting heat amount (ΔH) calculated from an area of the peak is 30 (J/g) or more, 5. the heat storage material composition as described in the above item 2 or 3, wherein the higher α-olefin polymer (a) satisfies at least one of the following (4a) to (4c):

(4a) a peak observed from a melting endothermic curve obtained by maintaining the above polymer at 190° C. for 5 minutes under nitrogen atmosphere by means of a differential scanning type calorimeter (DSC), then cooling down to −30° C. at 5° C./minute, maintaining at −30° C. for 5 minutes and then heating up to 190° C. at 10° C./minute is single, and a melting point (Tm) at a peak top thereof is 20 to 100° C., (4b) in measurement of spin-lattice relaxation time (T1) by solid NMR measurement, single T1 is observed in the melting point (Tm) or higher and (4c) observed is a single peak X1 originating in side chain crystallization observed at 15 deg<2θ<30 deg in measurement of wide-angle X ray scattering intensity distribution, 6. the heat storage material composition as described in the above item 2 or 3, wherein the higher α-olefin polymer (a) satisfies the following (5):

(5) a half band width (Wm) observed from a melting endothermic curve obtained by means of a differential scanning type calorimeter (DSC) is 10° C. or lower, 7. the heat storage material composition as described in the above item 2 or 3, wherein the higher α-olefin polymer (a) is obtained by polymerizing higher α-olefin in the presence of a catalyst for polymerization containing at least one kind of a component selected from:

(D) a transition metal compound represented by the following Formula (I), (E) (E-1) a compound which can form an ionic complex by reacting with the transition metal compound of the above component (D) or a derivative thereof and (E-2) aluminoxane:

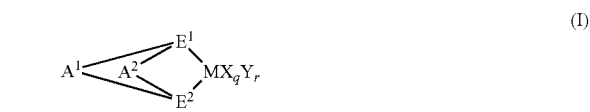

wherein M represents a metal element of the 3rd to 10th group in the periodic table or a lanthanoid series; $E^1$ and $E^2$ each represent a ligand selected from a substituted cyclopentadienyl group, an indenyl group, a substituted indenyl group, a heterocyclopentadienyl group, a substituted heterocyclopentadienyl group, an amide group, a phosphide group, a hydrocarbon group and a silicon-containing group, and they form a cross-linking structure via $A^1$ and $A^2$ and may be the same as or different from each other; X represents an α-bonding ligand, and when plural X's are present, plural X's may be the same or different and may be cross-linked with other X, $E^1$, $E^2$ or Y; Y represents a Lewis base, and when plural Y's are present, plural Y's may be the same or different and may be cross-linked with other Y, $E^1$, $E^2$ or X; $A^1$ and $A^2$ are divalent cross-linking groups bonding two ligands and represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$—; $R^1$ represents a hydrogen atom, a halogen atom, a hydrocarbon group having 1 to 20 carbon atoms or a halogen-containing hydrocarbon group having 1 to 20 carbon atoms, and they may be the same as or different from each other; q is an integer of 1 to 5 and represents [(valence of M)−2], and r represents an integer of 0 to 3, 8. the heat storage material composition as described in the above item 1, wherein the crystalline polyolefin (B) is at least one selected from a polyethylene base resin and a polypropylene base resin and 9. the heat storage material composition as described in the above item 1, wherein the elastomer (C) is at least one selected from an olefin base elastomer and a styrene base thermoplastic elastomer.

The heat storage material composition of the present invention has less bleeding and stickiness and is excellent in stability at high temperature, and it can meet a change in temperature such as a difference in room temperature when applied to materials for floor heating and can avoid a heating state deviated to high temperature or low temperature.

BEST MODE FOR CARRYING OUT THE INVENTION

The heat storage material composition of the present invention comprises 20 to 100% by weight of the heat storage material, 80 to 0% by weight of the crystalline polyolefin (B) and 50 to 0% by weight of the elastomer (C), and the heat storage material described above contains the side chain-crystalline polymer (A).

Preferably, it comprises 30 to 100% by weight of the heat storage material containing the side chain-crystalline polymer (A), 70 to 0% by weight of the crystalline polyolefin (B) and 30 to 0% by weight of the elastomer (C).

Further preferably, it comprises 50 to 100% by weight of the heat storage material containing the side chain-crystalline polymer (A), 50 to 0% by weight of the crystalline polyolefin (B) and 50 to 0% by weight of the elastomer (C), and particularly preferably, it comprises 70 to 100% by weight of the heat storage material containing the side chain-crystalline polymer (A), 30 to 0% by weight of the crystalline polyolefin (B) and 30 to 0% by weight of the elastomer (C).

If a content of the heat storage material containing the side chain-crystalline polymer (A) is less than 20% by weight, the heat storage amount per unit volume is reduced, and the performances of the heat storage material composition of the present invention are reduced.

In the present invention, the side chain-crystalline polymer (A) is called a comb type polymer and is a polymer having a side chain comprising an aliphatic and/or aromatic group while a skeleton (principal chain) comprises an organic structure, and the side chain has a structure which can be included in a crystalline structure.

A length of the side chain part is five times as large as a distance between the chains, and the examples thereof include side chain-crystalline polymers such as α-olefin base polymers, alkyl acrylate base polymers, alkyl methacrylate base polymers, alkyl ethylene oxide base polymers, polysiloxane base polymers and acrylamide base polymers.

Among them, particularly preferred is a higher α-olefin polymer (a) comprising a raw material of α-olefin in which a raw material is inexpensive and readily available and containing 50 mole % or more of α-olefin having 10 or more carbon atoms (hereinafter referred to merely as the higher α-olefin polymer (a)).

A composition comprising the higher α-olefin polymer (a) and a petroleum wax (b) in which a melting point (Tm) is higher by 10° C. or more than that of the polymer (a) (hereinafter referred to merely as the petroleum wax (b)) may be used for the heat storage material in the present invention.

The higher α-olefin polymer (a) is constituted mainly from olefin, and therefore it is excellent in compatibility with petroleum waxes.

Accordingly, a side chain-crystalline high polymer of a specific structure can introduce a low crystalline component (bleed component) which is left behind in crystallization of the petroleum wax into crystal when the side chain-crystalline high polymer is crystallized under lowering the temperature from a molten state, and therefore phase separation is less liable to take place in blending. The characteristics are excellent in long term stability, and the effect that the crystal of the higher α-olefin polymer (a) inhibits the petroleum wax from bleeding can be obtained as well.

The petroleum wax having a high melting point can be used, and therefore the advantage that a content of the bleed component is originally small can be obtained as well.

A composition of the higher α-olefin polymer (a) and the petroleum wax (b) is preferably 1000 parts by weight or less of the petroleum wax (b) based on 100 parts by weight of the higher α-olefin polymer (a).

The composition of 1000 parts by weight or less makes it possible for the higher α-olefin polymer (a) to inhibit the petroleum wax (b) from bleeding.

More preferably, a content of the petroleum wax (b) is 500 parts by weight or less based on 100 parts by weight of the higher α-olefin polymer (a), and particularly preferably, a content of the petroleum wax (b) is 200 parts by weight or less based on 100 parts by weight of the higher α-olefin polymer (a).

The higher α-olefin polymer (a) containing 50 mole % or more of α-olefin having 10 or more carbon atoms shall be explained below.

The higher α-olefin polymer (a) used in the present invention is a polymer containing 50 mole % or more of higher α-olefin having 10 or more carbon atoms.

If the carbon atom number is 10 or less, the crystallinity is not provided, and therefore the effect of the heat storage material is not obtained.

More preferred carbon atom number is 10 to 40, and further preferred carbon atom number is 14 to 24.

In the higher α-olefin polymer (a), a content of the higher α-olefin having 10 or more carbon atoms is preferably 50 to 100 mole %, more preferably 65 to 100 mole %, particularly preferably 80 to 100 mole %, very preferably 90 to 100 mole % and most preferably 100 mole %.

If a content of the higher α-olefin having 10 or more carbon atoms is 50 mole % or more, the side chain crystallinity is not lowered, and the efficiency of the heat storage material is good.

The higher α-olefin polymer (a) used in the present invention assumes preferably an isotactic structure, and the stereospecific index value M2 (mole %) is preferably 50 mole % or more, more preferably 50 to 90 mole %, particularly preferably 55 to 85 mole % and most preferably 55 to 75 mole %.

As described above, the effects of the present invention can be achieved by controlling the stereospecificity to a middle extent or more, further preferably to a middle extent.

If M2 is 90 mole % or less, the crystallinity is not too high, and the compatibility with other resins and waxes is high. If M2 is 50 mole % or more, the crystallinity is high, and the efficiency of the heat storage material is good.

The stereospecific index value M4 (mole %) which is the same index as pentad isotacticity is preferably 25 to 60 mole %, more preferably 25 to 45 mole %.

Further, the stereospecific index value MR (mole %) which is an index of disturbance of the stereospecificity is preferably 2.5 mole % or more, more preferably 5 mole % or more and particularly preferably 10 mole % or more.

The above stereospecific index values M2, M4 and MR are obtained based on a method proposed in [Macromolecules, 24, 2334 (1991)] reported by T. Asakura, M. Demura and Y. Nishiyama.

That is, they can be determined by making use of that $CH_2$ carbon at a side chain α-position is observed in a split state reflecting a difference in stereospecificity on a $^{13}C$ NMR spectrum.

It is shown that the smaller the values of M2 and M4 are, the smaller the isotacticity is, and it is shown that the larger the value of MR is, the more turbulent the stereospecificity is.

A $^{13}C$ NMR spectrum is measured on the following conditions by means of the following equipment. Equipment: EX-400, manufactured by JEOL Ltd. Measuring temperature: 130° C.

Pulse width: 45°

Integration frequency: 1000 times

Solvent: 90:10 (volume ratio) mixed solvent of 1,2,4-trichlorobenzene and heavy benzene The stereospecific index value is calculated in the following manner.

Six large peaks based on the mixed solvent are observed in 127 to 135 ppm.

Among these peaks, the value of the fourth peak from a lower magnetic field side is set as 131.1 ppm, and it is a standard for chemical shift.

In this case, an absorption peak based on $CH_2$ carbon at a side chain α-position is observed in the vicinity of 34 to 37 ppm.

In this case, M2, M4 and MR (mole %) are determined using the following equations:

$M2$=(integrated intensity of 36.2 to 35.3 ppm)/(integrated intensity of 36.2 to 34.5 ppm)×100

$M4$=(integrated intensity of 36.2 to 35.6 ppm)/(integrated intensity of 36.2 to 34.5 ppm)×100

$MR$=(integrated intensity of 35.3 to 35.0 ppm)/(integrated intensity of 36.2 to 34.5 ppm)×100

The higher α-olefin polymer (a) used in the present invention has a weight average molecular weight (Mw) of preferably 1,000 to 10,000,000 reduced to polystyrene which is measured by gel permeation chromatograph (GPC) method. If it is 1,000 or more, the strength is not reduced, and if it is 10,000,000 or less, molding and kneading are easy.

Mw is further preferably 10,000 to 5,000,000, more preferably 150,000 to 5,000,000, particularly preferably 300,000 to 2,000,000 and most preferably 300,000 to 1,000,000.

Also, the molecular weight distribution (Mw/Mn) measured by a GPC method is preferably 1.2 to 4.0. If it is 4.0 or less, the composition distribution is narrow, and the surface characteristic is not deteriorated. In particular, stickiness, bleeding and the heat stability are not reduced.

It is further preferably 1.2 to 3.5 or less, more preferably 1.2 to 3.0 or less and particularly preferably 1.2 to 2.3 or less.

The higher α-olefin polymer (a) used in the present invention is a crystalline resin which has a melting point (TmD) defined as a peak top of a peak observed from a melting endothermic curve obtained by maintaining the sample at −30° C. for 5 minutes under nitrogen atmosphere by means of a differential scanning type calorimeter (DSC) and then heating up to 190° C. at 10° C./minute and in which a melting point (Tm) defined as a peak top observed from a melting endothermic curve obtained by maintaining the sample at 190° C. for 5 minutes, then cooling down to −30° C. at 5° C./minute, maintaining at −30° C. for 5 minutes and then heating up to 190° C. at 10° C./minute is preferably 0 to 100° C., more preferably 20 to 100° C. and particularly preferably 25 to 80° C.

Also, a peak appearing in observing Tm is preferably single.

The single peak means that the other peaks and absorptions regarded as shoulders are not present.

Further, the heat storage material composition of the present invention has to absorb and release heat at prescribed temperatures, and therefore it is desired that melting and crystallization take place sharply at prescribed temperatures. It is desirable that the melting point (Tm) is single and that the melting peak half value width (Wm) is narrow.

The melting heat amount ΔH (J/g) observed in this case is preferably 30 J/g or more, more preferably 50 J/g or more, particularly preferably 60 J/g or more and most preferably 75 J/g or more.

If ΔH is 30 J/g or more, the efficiency of the heat storage material is high.

The melting peak half value width Wm (° C.) is determined as a peak width in a middle point of a height from a base line in the whole part of the melting peak in measuring Tm to the peak top.

To be specific, the half value width is preferably 10° C. or lower, more preferably 8° C. or lower, particularly preferably 6° C. or lower and most preferably 4° C. or lower.

In the higher α-olefin polymer (a) used in the present invention, single spin-lattice relaxation time (T1) is preferably observed in the melting point (Tm) or higher in measurement of T1 by solid NMR measurement.

In a solid NMR measuring method, the spin-lattice relaxation time [T1 (ms)] at the respective temperatures can be measured and confirmed, for example, by an inversion recover method (180° C.-τ-90° pulse method) by means of a solid NMR measuring equipment shown below.

Equipment: JNM-MU25 (pulse NMR) spectrometer, manufactured by JEOL Ltd.

Measured nucleus: hydrogen nucleus (1H)

Measuring frequency: 25 MHz

90° pulse width: 2.0 microsecond

In general, even if a crystalline layer and a non-crystalline layer are present in a mixture in a system in a crystalline high polymer, relaxation is averaged at a melting point or lower if interphase spin diffusion is quick, and single T1 is observed.

However, if an interphase spin diffusion speed is reduced by melting, plural T1's are observed in a certain case.

This is observed in a certain case when the system is uneven and a size of the crystal is large and when distribution is present in the size.

That is, single T1 which is observed at the melting point (Tm) or higher means that the system is even and that a size of the crystal is small and a distribution in the size is narrow.

If the system is even and the crystal is small, it leads to the advantage that sharp melting and crystallization, which are required of the heat storage material composition of the present invention, can be obtained.

In the higher α-olefin polymer (a) used in the present invention, preferably observed is a single peak X1 originating in side chain crystallization observed at 15 deg<2θ<30 deg in measurement of wide-angle X ray scattering intensity distribution.

As described above, if a peak originating in side chain crystallization is observed and a peak originating in side chain crystal is single in measurement of wide-angle X ray scattering intensity distribution, the crystal component is narrow and has a high intensity, so that heat absorption and heat generation are not generated in a wide temperature range, and the heat storage material composition is not reduced in an absorbing and releasing heat property at prescribed temperatures.

The wide-angle X ray scattering intensity distribution can be measured, for example, in the following manner.

Monochromatic light of a CuK α ray (wavelength=1.54 Å) at 30 kV and an output of 100 mA is collimated by a pinhole of ϕ2 mm by means of anticathode type Rotaflex Ru-200 manufactured by Rigaku Denki Co., Ltd. to measure wide-angle X ray scattering (WAXS) intensity distribution at an exposure time of one minute by means of a position-sensitive type proportional counter.

In the properties of the higher α-olefin polymer (a) explained above, the higher α-olefin polymer (a) preferably satisfies the following (1) to (3):

(1) a stereospecific index value M2 (mole %) is 50 mole % or more, (2) a weight average molecular weight (Mw) reduced to polystyrene which is measured by gel permeation chromatograph (GPC) is 1,000 to 10,000,000, and a molecular weight distribution is (Mw/Mn) is 1.2 to 4.0 and (3) a peak observed from a melting endothermic curve obtained by maintaining the above polymer at 190° C. for 5 minutes under nitrogen atmosphere by means of a differential scanning type calorimeter (DSC), then cooling down to −30° C. at 5° C./minute, maintaining at −30° C. for 5 minutes and then heating up to 190° C. at 10° C./minute is single, and a melting heat amount (ΔH) calculated from an area of the peak is 30 (J/g) or more.

Further, the higher α-olefin polymer (a) preferably satisfies at least one of the following (4a) to (4c):

(4a) a peak observed from a melting endothermic curve obtained by maintaining the above polymer at 190° C. for 5 minutes under nitrogen atmosphere by means of a differential scanning type calorimeter (DSC), then cooling down to −30° C. at 5° C./minute, maintaining at −30° C. for 5 minutes and then heating up to 190° C. at 10° C./minute is single, and a melting point (Tm) at a peak top thereof is 20 to 100° C., (4b) in measurement of spin-lattice relaxation time (T1) by solid NMR measurement, single T1 is observed in the melting point (Tm) or higher and (4c) observed is a single peak X1 originating in side chain crystallization observed at 15 deg<2θ<30 deg in measurement of wide-angle X ray scattering intensity distribution.

Further, the higher α-olefin polymer (a) preferably satisfies the following (5):

(5) a half band width (Wm) observed from a melting endothermic curve obtained by means of a differential scanning type calorimeter (DSC) is 10° C. or lower.

The α-olefin polymer (a) used in the present invention can be produced by using a metallocene base catalyst shown below, and among them, particularly a $C_2$ symmetric and $C_1$ symmetric transition metal compound which can synthesize an isotactic polymer is preferably used.

That is, it is a method for polymerizing higher α-olefin in the presence of a catalyst for polymerization containing at least one kind of a component selected from:

(D) a transition metal compound represented by the following Formula (I), (E) (E-1) a compound which can form an ionic complex by reacting with the transition metal compound of the above component (D) or a derivative thereof and (E-2) aluminoxane:

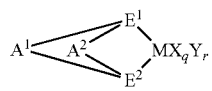

(I)

wherein M represents a metal element of the 3rd to 10th group in the periodic table or a lanthanoid series; $E^1$ and $E^2$ each represent a ligand selected from a substituted cyclopentadienyl group, an indenyl group, a substituted indenyl group, a heterocyclopentadienyl group, a substituted heterocyclopentadienyl group, an amide group, a phosphide group, a hydrocarbon group and a silicon-containing group, and they form a cross-linking structure via $A^1$ and $A^2$ and may be the same as or different from each other; X represents an α-bonding ligand, and when plural X's are present, plural X's may be the same or different and may be cross-linked with other X, $E^1$, $E^2$ or Y; Y represents a Lewis base, and when plural Y's are present, plural Y's may be the same or different and may be cross-linked with other Y, $E^1$, $E^2$ or X; $A^1$ and $A^2$ are divalent cross-linking groups bonding two ligands and represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$—; R$^1$ represents a hydrogen atom, a halogen atom, a hydrocarbon group having 1 to 20 carbon atoms or a halogen-containing hydrocarbon group having 1 to 20 carbon atoms, and they may be the same as or different from each other; q is an integer of 1 to 5 and represents [(valence of M)−2], and r represents an integer of 0 to 3.

In Formula (I) described above, M represents a metal element of the 3rd to 10th group in the periodic table or a lanthanoid series, and the specific examples thereof include titanium, zirconium, hafnium, yttrium, vanadium, chromium, manganese, nickel, cobalt, palladium and lanthanoid series metals. Among them, titanium, zirconium and hafnium are preferable with respect to polymerization activity.

$E^1$ and $E^2$ each represent a ligand selected from a substituted cyclopentadienyl group, an indenyl group, a substituted indenyl group, a heterocyclopentadienyl group, a substituted heterocyclopentadienyl group, an amide group (—N<), a phosphine group (—P<), a hydrocarbon group (>CR—, >C<) and a silicon-containing group (>SiR—, >Si<) (provided that R is hydrogen or a hydrocarbon group having 1 to 20 carbon atoms or a hetero atom-containing group), and they form a cross-linking structure via $A^1$ and $A^2$.

$E^1$ and $E^2$ may be the same as or different from each other.

Above $E^1$ and $E^2$ are preferably a substituted cyclopentadienyl group, an indenyl group and a substituted indenyl group.

X represents an α-bonding ligand, and when plural X's are present, plural X's may be the same or different and may be cross-linked with other X, $E^1$, $E^2$ or Y.

The specific examples of above X include a halogen atom, a hydrocarbon group having 1 to 20 carbon atoms, an alkoxy group having 1 to 20 carbon atoms, an aryloxy group having 6 to 20 carbon atoms, an amide group having 1 to 20 carbon atoms, a silicon-containing group having 1 to 20 carbon atoms, a phosphide group having 1 to 20 carbon atoms, a sulfide group having 1 to 20 carbon atoms and an acyl group having 1 to 20 carbon atoms.

On the other hand, Y represents a Lewis base, and when plural Y's are present, plural Y's may be the same or different and may be cross-linked with other Y, $E^1$, $E^2$ or X.

Amines, ethers, phosphines and thioethers can be given as the specific examples of the Lewis base of above Y.

Next, $A^1$ and $A^2$ are divalent cross-linking groups bonding two ligands and represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$—; R$^1$ represents a hydrogen atom, a halogen atom, a hydrocarbon group having 1 to 20 carbon atoms or a halogen-containing hydrocarbon group having 1 to 20 carbon atoms, and they may be the same as or different from each other.

Such cross-linking group includes, for example, groups represented by a formula:

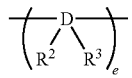

wherein D represents carbon, silicon or tin; $R^2$ and $R^3$ each represent a hydrogen atom or a hydrocarbon group having 1 to 20 carbon atoms, and they may be the same as or different from each other and may be combined with each other to form a ring structure; and e represents an integer of 1 to 4. The specific examples thereof include a methylene group, an ethylene group, an ethylidene group, a propylidene group, an isopropylidene group, a cyclohexylidene group, a 1,2-cyclohexylene group, a vinylidene group ($CH_2=C=$), a dimethylsilylene group, a diphenylsilylene group, a methylphenylsilylene group, a dimethylgermylene group, a dimethylstanylene group, a tetramethyldisilylene group and a diphenyldisilylene group.

Among them, an ethylidene group, an isopropylidene group and a dimethylsilylene group are suited.

The number q is an integer of 1 to 5 and represents [(valence of M)−2], and r represents an integer of 0 to 3.

Among the transition metal compounds represented by Formula (I), preferred are transition metal compounds represented by Formula (II) comprising a double cross-linked type biscyclopentadienyl derivative as a ligand:

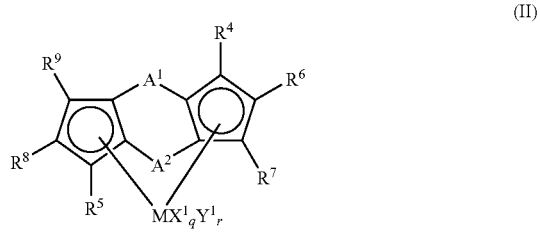

(II)

In Formula (II) described above, M, $A^1$, $A^2$, q and r are the same as in Formula (I).

$X^1$ represents an α-bonding ligand, and when plural $X^1$'s are present, plural $X^1$'s may be the same or different and may be cross-linked with other X' or $Y^1$.

The same ones as those given as the examples in explaining X of Formula (I) can be given as the specific examples of above $X^1$.

$Y^1$ represents a Lewis base, and when plural $Y^1$'s are present, plural $Y^1$'s may be the same or different and may be cross-linked with other $Y^1$ or $X^1$.

The same ones as those given as the examples in explaining Y of Formula (I) can be given as the specific examples of above $Y^1$.

$R^4$ to $R^9$ each represent a hydrogen atom, a halogen atom, a hydrocarbon group having 1 to 20 carbon atoms, a halogen-containing group having 1 to 20 carbon atoms, a silicon-containing group or a hetero atom-containing group, and at least one of them is required not to be a hydrogen atom.

Further, $R^4$ to $R^9$ may be the same as or different from each other, and the adjacent groups may be combined with each other to form a ring.

Among them, $R^6$ and $R^7$ preferably form a ring, and $R^8$ and $R^9$ preferably form a ring.

Groups containing hetero atoms such as oxygen, halogen and silicon are preferred as $R^4$ and $R^5$ since the polymerization activity is enhanced.

The transition metal compound comprising a double cross-linked type biscyclopentadienyl derivative as a ligand is preferably a compound containing silicon in a cross-linking group between the ligands.

The specific examples of the transition metal compound represented by Formula (I) include (1,2'-ethylene) (2,1'-ethylene)-bis(indenyl)zirconium dichloride, (1,2'-methylene)(2,1'-methylene)-bis(indenyl)zirconium dichloride, (1,2'-isopropylidene)(2,1'-isopropylidene)-bis(indenyl)zirconium dichloride, (1,2'-ethylene)(2,1'-ethylene)-bis(3-methylindenyl)zirconium dichloride, (1,2'-ethylene)(2,1'-ethylene)-bis(4,5-benzoindenyl)-zirconium dichloride, (1,2'-ethylene)(2,1'-ethylene)-bis(4-isopropylindenyl)zirconium dichloride, (1,2'-ethylene)(2,1'-ethylene)-bis(5,6-dimethylindenyl)-zirconium dichloride, (1,2'-ethylene)(2,1'-ethylene)-bis(4,7-diisopropylindenyl)zirconium dichloride, (1,2'-ethylene)(2,1'-ethylene)-bis(4-phenylindenyl)zirconium dichloride, (1,2'-ethylene)(2,1'-ethylene)-bis(3-methyl-4-isopropylindenyl) zirconium dichloride, (1,2'-ethylene)(2,1'-ethylene)-bis(5,6-benzoindenyl)-zirconium dichloride, (1,2'-ethylene)(2,1'-isopropylidene)-bis(indenyl)zirconium dichloride, (1,2'-methylene)(2,1'-ethylene)-bis(indenyl)zirconium dichloride, (1,2'-methylene)(2,1'-isopropylidene)-bis(indenyl)zirconium dichloride, (1,2'-dimethylsilylene)(2,1'-dimethylsilylene)bis(indenyl)-zirconium dichloride, (1,2'-dimethylsilylene)(2,1'-dimethylsilylene)bis(3-methylindenyl) zirconium dichloride, (1,2'-dimethylsilylene)(2,1'-dimethylsilylene)bis(3-n-buthylindenyl)zirconium dichloride, (1,2'-dimethylsilylene)(2,1'-dimethylsilylene)bis(3-i-propylindenyl)zirconium dichloride, (1,2'-dimethylsilylene)(2,1'-dimethylsilylene)bis(3-trimethylsilylmethylindenyl)-zirconium dichloride, (1,2'-dimethylsilylene)(2,1'-dimethylsilylene)bis(3-phenylindenyl)zirconium dichloride, (1,2'-dimethylsilylene)(2,1'-dimethylsilylene)bis(4,5-benzoindenyl)zirconium dichloride, (1,2'-dimethylsilylene)(2,1'-dimethylsilylene)bis(4-isopropylindenyl)zirconium dichloride, (1,2'-dimethylsilylene)(2,1'-dimethylsilylene)bis(5,6-dimethylindenyl)zirconium dichloride, (1,2'-dimethylsilylene)(2,1'-dimethylsilylene)bis(4,7-di-1-propylindenyl) zirconium dichloride, (1,2'-dimethylsilylene)(2,1'-dimethylsilylene)bis(4-phenylindenyl)zirconium dichloride, (1,2'-dimethylsilylene)(2,1'-dimethylsilylene)bis(3-methyl-4-i-propylindenyl)zirconium dichloride, (1,2'-dimethylsilylene)(2,1'-dimethylsilylene)bis(5,6-benzoindenyl)zirconium dichloride, (1,2'-dimethylsilylene)(2,1'-isopropylidene)-bis(indenyl) zirconium dichloride, (1,2'-dimethylsilylene)(2,1'-isopropylidene)-bis(3-methylindenyl)zirconium dichloride, (1,2'-dimethylsilylene) (2,1'-isopropylidene)-bis(3-1-propylindenyl)zirconium dichloride, (1,2'-dimethylsilylene)(2,1'-isopropylidene)-bis(3-n-butylindenyl)zirconium dichloride, (1,2'-dimethylsilylene)(2,1'-isopropylidene)-bis(3-trimethylsilylmethylindenyl)-zirconium dichloride, (1,2'-dimethylsilylene)(2,1'-isopropylidene)-bis(3-trimethylsilylindenyl)zirconium dichloride, (1,2'-dimethylsilylene)(2,1'-isopropylidene)-bis(3-phenylindenyl)zirconium dichloride, (1,2'-dimethylsilylene)(2,1'-methylene)-bis(indenyl)zirconium dichloride, (1,2'-dimethylsilylene)(2,1'-methylene)-bis(3-methylindenyl)zirconium dichloride, (1,2'-dimethylsilylene) (2,1'-methylene)-bis(3-1-propylindenyl)zirconium dichloride, (1,2'-dimethylsilylene) (2,1'-methylene)-bis(3-n-butylindenyl) zirconium dichloride, (1,2'-dimethylsilylene)(2,1'-methylene)-bis(3-trimethylsilylmethylindenyl)zirconium dichloride, (1,2'-dimethylsilylene)(2,1'-methylene)-bis(3-trimethylsilylindenyl)zirconium dichloride, (1,2'-diphenylsilylene)(2,1'-methylene)-bis(indenyl)zirconium dichloride, (1,2'-diphenylsilylene)(2,1'-methylene)-bis(3-methylindenyl)zirconium dichloride, (1,2'-diphenylsilylene) (2,1'-methylene)-bis(3-i-propylindenyl)zirconium dichloride, (1,2'-diphenylsilylene) (2,1'-methylene)-bis(3-n-butylindenyl) zirconium dichloride, (1,2'-diphenylsilylene)(2,1'-methylene)-bis(3-trimethylsilylmethylindenyl)zirconium dichloride, (1,2'-diphenylsilylene)(2,1'-methylene)-bis(3-trimethylsilylindenyl)zirconium dichloride, (1,2'-dimethylsilylene)(2,1'-dimethylsilylene)(3-methylcyclopentadienyl)(3'-methylcyclopentadienyl)-zirconium dichloride, (1,2'-dimethylsilylene)(2,1'-isopropylidene)(3-methylcyclopentadienyl)(3'-methylcyclopentadienyl) zirconium dichloride, (1,2'-dimethylsilylene)(2,1'-ethylene) (3-methylcyclopentadienyl)(3'-methylpentadienyl)-zirconium dichloride, (1,2'-ethylene)(2,1'-methylene)(3- methylcyclopentadienyl)(3'-methylcyclopentadienyl)zirconium dichloride, (1,2'-ethylene)(2,1'-isopropylidene)(3-methylcyclopentadienyl)(3'-methylcyclopentadienyl)zirconium dichloride, (1,2'-methylene)(2,1'-methylene)(3-methylcyclopentadienyl)(3'-methylcyclopentadienyl)zirconium dichloride, (1,2'-methylene)(2,1'-isopropylidene)(3-methylcyclopentadienyl)(3'-methylcyclopentadienyl)zirconium dichloride, (1,2'-isopropylidene)(2,1'-isopropylidene)(3-methylcyclopentadienyl)(3'-methylcyclopentadienyl)zirconium dichloride, (1,2'-dimethylsilylene)(2,1'-dimethylsilylene)(3,4-dimethylcyclopentadienyl)-(3',4'-dimethylcyclopentadienyl)zirconium dichloride, (1,2'-dimethylsilylene)(2,1'-isopropylidene)(3,4-dimethylcyclopentadienyl)(3',4'-dimethylcyclopentadienyl)zirconium dichloride, (1,2'-dimethylsilylene)(2,1'-ethylene)(3,4-dimethylcyclopentadienyl)(3',4'-dimethylcyclopentadienyl)zirconium dichloride, (1,2'-ethylene)(2,1'-methylene)(3,4-dimethylcyclopentadienyl)(3',4'-dimethylcyclopentadienyl)zirconium dichloride, (1,2'-ethylene)(2,1'-isopropylidene)(3,4-dimethylcyclopentadienyl)(3',4'-dimethylcyclopentadienyl)zirconium dichloride, (1,2'-methylene)(2,1'-methylene)(3,4-dimethylcyclopentadienyl)(3',4'-dimethylcyclopentadienyl)zirconium dichloride, (1,2'-methylene)(2,1'-isopropylidene)(3,4-dimethylcyclopentadienyl)(3',4'-dimethylcyclopentadienyl)zirconium dichloride, (1,2'-isopropylidene)(2,1'-isopropylidene) (3,4-dimethylcyclopentadienyl)(3',4'-dimethylcyclopentadienyl)zirconium dichloride, (1,2'-dimethylsilylene)(2,1'-dimethylsilylene)(3-methyl-5-ethylcyclopentadienyl)(3'-methyl-5'-ethylcyclopentadienyl)zirconium dichloride, (1,2'-dimethylsilylene)(2,1'-dimethylsilylene)(3-methyl-5-ethylcyclopentadienyl)(3'-methyl-5'-ethylcyclopentadienyl)zirconium dichloride, (1,2'-dimethylsilylene)(2,1'-dimethylsilylene)(3-methyl-5-isopropylcyclopentadienyl)(3'-methyl-5'-isopropylcyclopentadienyl)zirconium dichloride, (1,2'-dimethylsilylene)(2,1'-dimethylsilylene)(3-methyl-5-n-butylcyclopentadienyl) (3'-methyl-5'-n-butylcyclopentadienyl)zirconium dichloride, (1,2'-dimethylsilylene)(2,1'-dimethylsilylene)(3-methyl-5-phenylcyclopentadienyl)(3'-methyl-5'-phenylcyclopentadienyl)zirconium dichloride, (1,2'-dimethylsilylene)(2,1'-isopropylidene)(3-methyl-5-ethylcyclopentadienyl)(3'-methyl-5'-ethylcyclopentadienyl) zirconium dichloride, (1,2'-dimethylsilylene)(2,1'-isopropylidene)(3-methyl-5-1-propylcyclopentadienyl)(3'-methyl-5'-1-propylcyclopentadienyl)zirconium dichloride, (1,2'-dimethylsilylene)(2,1'-isopropylidene)(3-methyl-5-n-butylcyclopentadienyl)(3'-methyl-5'-n-butylcyclopentadienyl)zirconium dichloride, (1,2'-dimethylsilylene)(2,1'-isopropylidene)(3-methyl-5-phenylcyclopentadienyl)(3'-methyl-5'-phenylcyclopentadienyl)zirconium dichloride, (1,2'-dimethylsilylene)(2,1'-ethylene)(3-methyl-5-ethylcyclopentadienyl)(3'-methyl-5'-ethylcyclopentadienyl)zirconium dichloride, (1,2'-dimethylsilylene) (2,1'-ethylene) (3-methyl-5-1-propylcyclopentadienyl)(3'-methyl-5'-1-propylcyclopentadienyl)zirconium dichloride, (1,2'-dimethylsilylene) (2,1'-ethylene) (3-methyl-5-n-butylcyclopentadienyl) (3'-methyl-5'-n-butylcyclopentadienyl)zirconium dichloride, (1,2'-dimethylsilylene)(2,1'-ethylene)(3-methyl-5-phenylcyclopentadienyl)(3'-methyl-5'-phenylcyclopentadienyl)zirconium dichloride, (1,2'-dimethylsilylene)(2,1'-methylene)(3-methyl-5-ethylcyclopentadienyl)(3'-methyl-5'-ethylcyclopentadienyl)zirconium dichloride, (1,2'-dimethylsilylene) (2,1'-methylene) (3-methyl-5-1-propylcyclopentadienyl)(3'-methyl-5'-1-propylcyclopentadienyl)zirconium dichloride, (1,2'-dimethylsilylene)(2,1'-methylene) (3-methyl-5-n-butylcyclopentadienyl)(3'-methyl-5'-n-butylcyclopentadienyl)zirconium dichloride, (1,2'-dimethylsilylene)(2,1'-methylene)(3-methyl-5-phenylcyclopentadienyl)(3'-methyl-5'-phenylcyclopentadienyl)zirconium dichloride, (1,2'-ethylene)(2,1'-methylene)(3-methyl-5-1-propylcyclopentadienyl)(3'-methyl-5'-1-propylcyclopentadienyl)zirconium dichloride, (1,2'-ethylene)(2,1'-isopropylidene) (3-methyl-5-i-propylcyclopentadienyl)(3'-methyl-5'-1-propylcyclopentadienyl)zirconium dichloride, (1,2'-methylene) (2,1'-methylene) (3-methyl-5-1-propylcyclopentadienyl)(3'-methyl-5'-1-propylcyclopentadienyl)zirconium dichloride, (1,2'-methylene) (2,1'-isopropylidene) (3-methyl-5-1-propylcyclopentadienyl)(3'-methyl-5'-1-propylcyclopentadienyl)zirconium dichloride, (1,1'-dimethylsilylene)(2,2'-dimethylsilylene) bisindenylzirconium dichloride, (1,1'-diphenylsilylene)(2,2'-dimethylsilylene)bisindenylzirconium dichloride, (1,1'-dimethylsilylene)(2,2'-dimethylsilylene)-bisindenylzirconium dichloride, (1,1'-diisopropylsilylene)(2,2'-dimethylsilylene)-bisindenylzirconium dichloride, (1,1'-dimethylsilylene)(2,2'-diisopropylsilylene)-bisindenylzirconium dichloride, (1,1'-dimethylsilyleneindenyl)(2,2'-dimethylsilylene-3-trimethylsilylindenyl)zirconium dichloride, (1,1'-diphenylsilyleneindenyl)(2,2'-diphenylsilylene-3-trimethylsilylindenyl)zirconium dichloride, (1,1'-diphenylsilyleneindenyl)(2,2'-dimethylsilylene-3-trimethylsilylindenyl)zirconium dichloride, (1,1'-dimethylsilylene)(2,2'-dimethylsilylene)(indenyl)(3-trimethylsilylindenyl)zirconium dichloride, (1,1'-diphenylsilylene)(2,2'-diphenylsilylene)(indenyl)(3-trimethylsilylindenyl)zirconium dichloride, (1,1'-diphenylsilylene)(2,2'-dimethylsilylene)(indenyl)(3-trimethylsilylindenyl)zirconium dichloride, (1,1'-dimethylsilylene)(2,2'-diphenylsilylene)(indenyl)(3-trimethylsilylindenyl)zirconium dichloride, (1,1'-diisopropylsilylene)(2,2'-dimethylsilylene)(indenyl)-(3-trimethylsilylindenyl)zirconium dichloride, (1,1'-dimethylsilylene)(2,2'-diisopropylsilylene)(indenyl)-(3-trimethylsilylindenyl)zirconium dichloride, (1,1'-diisopropylsilylene)(2,2'-diisopropylsilylene)-(indenyl)(3-trimethylsilylindenyl)zirconium dichloride, (1,1'-dimethylsilylene)(2,2'-dimethylsilylene)(indenyl)(3-trimethylsilylmethylindenyl)zirconium dichloride, (1,1'-diphenylsilylene)(2,2'-diphenylsilylene)-(indenyl)(3-trimethylsilylmethylindenyl)zirconium dichloride, (1,1'-diphenylsilylene)(2,2'-dimethylsilylene)(indenyl)(3-trimethylsilylmethylindenyl)zirconium dichloride, (1,1'-dimethylsilylene)(2,2'-diphenylsilylene)(indenyl)(3-trimethylsilylmethylindenyl)zirconium dichloride, (1,1'-diisopropylsilylene)(2,2'-dimethylsilylene)-(indenyl)(3-trimethylsilylmethylindenyl)zirconium dichloride, (1,1'-dimethylsilylene)(2,2'-diisopropylsilylene)(indenyl)(3-trimethylsilylmethylindenyl)zirconium dichloride and (1,1'-diisopropylsilylene)(2,2'-diisopropylsilylene)-(indenyl)(3-trimethylsilylmethylindenyl)zirconium dichloride, and those obtained by substituting zirconium in the above compounds with titanium or hafnium.

However, the above recited transition metal compounds of formula (I) are not be restricted to those listed above.

Also, the transition metal compounds of formula (I) may be analogous compounds of metal elements of the other recited periodic groups or lanthanoid series.

In the compounds described above, (1-1'-)(2-2'-) may be (1-2'-)(2-1'-), and (1-2'-)(2-1'-) may be (1-1'-)(2-2'-).

Next, any compounds can be used as the (E-1) component out of the (E) components as long as they can form an ionic complex by reacting with the transition metal compound of the component (D) described above, and compounds represented by the following Formulas (III) and (IV) can suitably be used:

  (III)

  (IV)

(provided that $L^2$ is $M^2$, $R^{11}R^{12}M^3$, $R^{13}{}_3C$ or $R^{13}M^3$) [in Formulas (III) and (IV), $L^1$ represents a Lewis base; $[Z]^-$ represents non-coordinating anions $[Z^1]^-$ and $[Z^2]^-$, wherein $[Z^1]^-$ represents an anion in which plural groups are bonded to an element, that is, $[M^1{}_G{}^1G^2 \ldots G^f]^-$ (wherein $M^1$ represents a 5th to 15th group element in the periodic table, preferably a • 13th to 15th group element in the periodic table; $G^1$ to $G^f$ each represent a hydrogen atom, a halogen atom, an alkyl group having 1 to 20 carbon atoms, a dialkylamino group having 2 to 40 carbon atoms, an alkoxy group having 1 to 20 carbon atoms, an aryloxy group having 6 to 20 carbon atoms, an alkylaryl group having 7 to 40 carbon atoms, an arylalkyl group having 7 to 40 carbon atoms, a halogen-substituted hydrocarbon group having 1 to 20 carbon atoms, an acyloxy group having 1 to 20 carbon atoms, an organic metalloid group or a hetero atom-containing group having 2 to 20 carbon atoms; two or more of $G^1$ to $G^f$ may form a ring; and f represents an integer of [(valence of central metal $M^1$)+1]); $[Z^2]^-$ represents a conjugate base of Brønsted acid alone in which a logarithm (pKa) of an inverse number of an acid dissociation constant is −10 or less or combination of a Brønsted acid and a Lewis acid or a conjugate base of an acid which is usually defined as superstrong acid; it may be coordinated with a Lewis base; $R^{10}$ represents a hydrogen atom, an alkyl group having 1 to 20 carbon atoms, an aryl group having 6 to 20 carbon atoms, an alkylaryl group or an arylalkyl group; $R^{11}$ and $R^{12}$ each represent a cyclopentadienyl group, a substituted cyclopentadienyl group, an indenyl group or a fluorenyl group; $R'^3$ represents an alkyl group having 1 to 20 carbon atoms, an aryl group, an alkylaryl group or an arylalkyl group; $R^{14}$ represents a macrocyclic ligand such as tetraphenylporphyrin and phthalocyanine; k is an ionic valency of $[L^1-R^{10}]$ and $[L^2]$ and represents an integer of 1 to 3; a represents an integer of 1 or more; b is (k×a); $M^2$ includes an element of the 1st to 3rd, 11th to 13th and 17th groups in the periodic table; and $M^3$ represents an element of the 7th to 12th groups in the periodic table].

In this respect, the specific examples of $L^1$ include amines such as ammonia, methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline and p-nitro-N,N-dimethylaniline, phosphines such as trimethylphosphine, triphenylphosphine and diphenylphosphine, thioethers such as tetrahydrothiophene, esters such as ethyl benzoate and nitriles such as acetonitrile and benzonitrile.

Hydrogen, methyl, ethyl, benzyl and trityl can be given as the specific examples of $R^{10}$, and cyclopentadienyl, methylcyclopentadienyl, ethylcyclopentadienyl and pentamethylcyclopentadienyl can be given as the specific examples of $R^{11}$ and $R^{12}$.

Phenyl, p-tolyl and p-methoxyphenyl can be given as the specific examples of $R^{13}$, and tetraphenylporphin, phthalocyanine, allyl and methallyl can be given as the specific examples of $R^{14}$.

Further, Li, Na, K, Ag, Cu, Br, I and $I_3$ can be given as the specific examples of $M^2$, and Mn, Fe, Co, Ni and Zn can be given as the specific examples of $M^3$.

In $[Z^1]^-$, that is, $[M^1G^1G^2 \ldots G^f]$, the specific examples of $M^1$ include B, Al, Si, P, As and Sb, and they include preferably B and Al.

Specific examples of $G^1$, $G^2$ to $G^f$ include dimethylamino and diethylamino as a dialkylamino group, methoxy, ethoxy, n-butoxy and phenoxy as an alkoxy group or an aryloxy group, methyl, ethyl, n-propyl, isopropyl, n-butyl, isobutyl, n-octyl, n-eicosyl, phenyl, p-tolyl, benzyl, 4-tert-butylphenyl and 3,5-dimethylphenyl as a hydrocarbon group, fluorine, chlorine, bromine and iodine as a halogen atom, p-fluorophenyl, 3,5-difluorophenyl, pentachlorophenyl, 3,4,5-trifluorophenyl, pentafluorophenyl, 3,5-bis(trifluoromethyl)phenyl and bis(trimethylsilyl)methyl as a hetero atom-containing group and pentamethylantimony, trimethylsilyl, trimethylgermyl, diphenylarsine, dicyclohexylantimony and diphenylboron as an organic metalloid group.

Further, trifluoromethanesulfonic acid anion $(CF_3SO_3)^-$, bis(trifluoromethanesulfonyl)methyl anion, bis(trifluoromethanesulfonyl)benzyl anion, bis(trifluoromethanesulfonyl)amido, perchloric acid anion $(ClO_4)^-$, trifluoroacetic acid anion $(CF_3CO_2)^-$, hexafluoroantimony anion $(SbF_6)^-$, fluorosulfonic acid anion $(FSO_3)^-$, chlorosulfonic acid anion $(ClSO_3)^-$, fluorosulfonic acid anion/antimony pentafluoride $(FSO_3/SbF_5)^-$, fluorosulfonic acid anion/arsenic pentafluoride $(FSO_3/AsF_5)^-$, trifluoromethanesulfonic acid/antimony pentafluoride $(CF_3SO_3/SbF_5)^-$ can be given as the specific examples of the non-coordinating anion, that is, a conjugate base $[Z^2]^-$ of a Brønsted acid alone having a pKa of −10 or less or combination of a Brønsted acid and a Lewis acid.

Specific examples of the ionic compound which is reacted with the transition metal compound of the (D) component described above to form an ionic complex, that is, the (E-1) component, include triethylammonium tetraphenylborate, tri-n-butylammonium tetraphenylborate, trimethylammonium tetraphenylborate, tetraethylammonium tetraphenylborate, methyl(tri-n-butyl)ammonium tetraphenylborate, benzyl(tri-n-butyl)ammonium tetraphenylborate, dimethyldiphenylammonium tetraphenylborate, triphenyl(methyl)ammonium tetraphenylborate, trimethylanilinium tetraphenylborate, methylpyridinium tetraphenylborate, benzylpyridinium tetraphenylborate, methyl(2-cyanopyridinium)tetraphenylborate, triethylammonium tetrakis(pentafluorophenyl)borate, tri-n-butylammonium tetrakis(pentafluorophenyl)borate, triphenylammonium tetrakis(pentafluorophenyl)borate, tetra-n-butylammonium tetrakis(pentafluorophenyl)-borate, tetraethylammonium tetrakis-(pentafluorophenyl)borate, benzyl(tri-n-butyl)ammonium tetrakis(pentafluorophenyl)borate, methyldiphenylammonium tetrakis(pentafluorophenyl)-borate, triphenyl(methyl)ammonium tetrakis(pentafluorophenyl)borate, methylanilinium tetrakis(pentafluorophenyl)borate, dimethylanilinium tetrakis(pentafluorophenyl)borate, triethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium)tetrakis(pentafluorophenyl)borate, benzyl (2-cyanopyridinium)tetrakis-(pentafluorophenyl)borate, methyl(4-cyanopyridinium) tetrakis(pentafluorophenyl)borate, triphenylsulfonium tetrakis(pentafluorophenyl)borate, dimethylanilinium tetrakis[bis(3,5-ditrifluomethyl)phenyl]

borate, ferrocenium tetraphenylborate, silver tetraphenylborate, trityl tetraphenylborate, tetraphenylporphyrinmanganese tetraphenylborate, ferrocenium tetrakis (pentafluorophenyl)borate, (1,1'-dimethylferrocenium) tetrakis(pentafluorophenyl)-borate, decamethylferrocenium tetrakis-(pentafluorophenyl)borate, silver tetrakis-(pentafluorophenyl)borate, trityl tetrakis-(pentafluorophenyl)borate, lithium tetrakis-(pentafluorophenyl)borate, sodium tetrakis-(pentafluorophenyl)borate, tetraphenylporphyrinmanganese tetrakis(pentafluorophenyl)borate, silver tetrafluoroborate, silver hexafluorophosphonate, silver hexafluoroarsenate, silver perchlorate, silver trifluoroacetate and silver trifluoromethanesulfonate.

(E-1) may be used alone or in combination of two or more kinds thereof.

On the other hand, capable of being given as aluminoxane of the (E-2) component are chain aluminoxane represented by Formula (V):

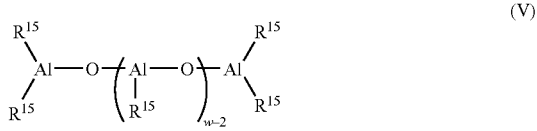

(wherein $R^{15}$ represents a hydrocarbon group such as an alkyl group having 1 to 20, preferably 1 to 12 carbon atoms, an alkenyl group, an aryl group and an arylalkyl group or a halogen atom; w represents an average polymerization degree, and it is an integer of usually 2 to 50, preferably 2 to 40; and respective $R^{15}$ may be the same or different) and cyclic aluminoxane represented by Formula (VI):

(wherein $R^{15}$ and w are the same as in Formula (V) described above).

A production process for the aluminoxane described above includes a process in which alkylaluminum is brought into contact with a condensing agent such as water, but the means therefor shall not specifically be restricted, and the reaction may be carried out according to a publicly known process.

It includes, for example, (a) a process in which an organic aluminum compound is dissolved in an organic solvent and in which the solution is brought into contact with water, (b) a process in which an organic aluminum compound is initially added in polymerization and in which water is then added thereto, (c) a process in which crystal water contained in metal salts and water absorbed on inorganic matters and organic matters are reacted with an organic aluminum compound and (d) a process in which tetraalkyldialuminoxane is reacted with trialkylaluminum and in which it is further reacted with water.

The aluminoxane may be insoluble in toluene.

The above aluminoxanes may be used alone or in combination of two or more kinds thereof.

A use proportion of the (D) catalyst component to the (E) catalyst component falls in a range of preferably 10:1 to 1:100, more preferably 2:1 to 1:10 in terms of a mole ratio when the (E-1) compound is used as the (E) catalyst component. If the range described above is deviated, the catalyst cost per unit mass of the polymer grows high, and it is not practical.

When the (E-2) compound is used, it falls in a range of preferably 1:1 to 1:1000000, more preferably 1:10 to 1:10000 in terms of a mole ratio.

If the above range is deviated, the catalyst cost per unit mass of the polymer grows high, and it is not practical.

(E-1) and (E-2) as the (E) catalyst component can be used alone or in combination of two or more kinds thereof.

An organic aluminum compound as a (F) component in addition to the (D) component and the (E) component can be used as a catalyst for polymerization used in producing the α-olefin polymer (a) of the present invention.

In this case, a compound represented by Formula (VII) is used as the organic aluminum compound of the (F) component:

$$R^{16}{}_v AlJ_{3-v} \qquad (VII)$$

wherein $R^{16}$ represents an alkyl group having 1 to 10 carbon atoms; J represents a hydrogen atom, an alkoxy group having 1 to 20 carbon atoms, an aryl group having 6 to 20 carbon atoms or a halogen atom; and v is an integer of 1 to 3.

The specific examples of the compound represented by Formula (VII) includes trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride and ethylaluminum sesquichloride.

The above organic aluminum compounds may be used alone or in combination of two or more kinds thereof.

A use proportion of the (D) catalyst component to the (F) catalyst component falls in a range of preferably 1:1 to 1:10000, more preferably 1:5 to 1:2000 and further preferably 1:10 to 1:1000 in terms of a mole ratio.

Use of the above (F) catalyst component makes it possible to enhance the polymerization activity per the transition metal. However if it is too much, the organic aluminum compound is wasted, and it remains in the polymer in a large amount. Accordingly, it is not preferred.

In producing the α-olefin polymer (a) used in the present invention, at least one of the catalyst components, which is carried on a suitable carrier, can be used.

The kind of the above carrier shall not specifically be restricted, and any of inorganic oxide carriers, inorganic carriers excluding them and organic carriers can be used. In particular, the inorganic oxide carriers and the inorganic carriers excluding them are preferred.

In the production of the α-olefin polymer (a) used in the present invention, the catalyst can be produced by carrying out an operation for carrying at least one of the (D) component and the (E) component on the carrier in the polymerization system.

Capable of being used is, for example, a method in which at least one of the (D) component and the (E) component and the carrier and, if necessary, the organic aluminum compound of the (F) component are added and in which olefin such as ethylene is added thereto at atmospheric pressure to 2 MPa (gauge) to carry out pre-polymerization at −20 to 200° C. for 1 minute to 2 hours, whereby catalyst particles are produced.

On the other hand, magnesium compounds represented by Formula $MgR^{17}{}_x X^1{}_y$ which are represented by $MgCl_2$ and $Mg(OC_2H_5)_2$ and complex salts thereof can be given as carriers other than those described above.

In this case, $R^{17}$ represents an alkyl group having 1 to 20 carbon atoms, an alkoxy group having 1 to 20 carbon atoms or an aryl group having 6 to 20 carbon atoms; $X^1$ represents a halogen atom or an alkyl group having 1 to 20 carbon atoms; x is 0 to 2, and y is 0 to 2; and x+y=2.

Respective $R^{17}$ and respective $X^1$ may be the same or different.

Capable of being given as the organic carrier are polymers such as polystyrene, styrene-divinylbenzene copolymers, polyethylene, poly-1-butene, substituted polystyrene and polyacrylate, starch and carbon.

The carrier for the catalyst used for producing the α-olefin polymer (a) used in the present invention are preferably $MgCl_2$, $MgCl(OC_2H_5)$, $Mg(OC_2H_5)_2$, $SiO_2$ and $Al_2O_3$.

The properties of the carrier are varied depending on the kind and the production process thereof, and the average particle diameter is usually 1 to 300 μm, preferably 10 to 200 μm and more preferably 20 to 100 μm.

If the particle diameter is 1 to 300 μm, the particle diameter is not too small, and fine powder contained in the polymer is not increased. The particle diameter is not too large, and coarse particles contained in the polymer are not increased or a reduction in the bulk density and clogging of a hopper are not caused.

A specific surface area of the carrier is usually 1 to 1000 $m^2/g$, preferably 50 to 500 $m^2/g$, and a pore volume thereof is usually 0.1 to 5 $cm^3/g$, preferably 0.3 to 3 $cm^3/g$.

If either of the specific surface area and the pore volume falls in the ranges described above, the catalyst activity is not lowered.

The specific surface area and the pore volume can be determined from a volume of absorbed nitrogen gas according to, for example, a BET method [refer to J. Am. Chem. Soc., 60, 309 (1983)].

Further, if the carrier described above is an inorganic oxide carrier, it is used preferably after burned usually at 150 to 1000° C., preferably 200 to 800° C.

When at least one of the catalyst components is carried on the carrier described above, at least one of the (D) catalyst component and the (E) catalyst component, preferably both of the (D) component and the (E) component are preferably carried.

A method for carrying at least one of the (D) component and the (E) component on the above carrier shall not specifically be restricted, and capable being used are, for example, (i) a method in which at least one of the (D) component and the (E) component is mixed with the carrier, (ii) a method in which the carrier is treated with an organic aluminum compound or a halogen-containing silicon compound and in which it is then mixed with at least one of the (D) component and the (E) component in an inert solvent, (iii) a method in which the (D) component and/or the (E) component are reacted with an organic aluminum compound or a halogen-containing silicon compound, (iv) a method in which the (D) component or the (E) component is carried on the carrier and in which it is then mixed with the (E) component or the (D) component, (v) a method in which a catalytic reaction product of the (D) component with the (E) component is mixed with the carrier and (vi) a method in which the carrier is allowed to be coexistent in the catalytic reaction of the (D) component with the (E) component.

In the methods of (iv), (v) and (vi) each described above, the organic aluminum compound of the (F) component can be added as well.

The catalyst thus obtained may be taken out in the form of a solid matter after the solvent is once distilled off and then used for polymerization, or it may be used for polymerization as it is.

In the production of the α-olefin polymer (a) used in the present invention, the catalyst can be produced by carrying out an operation for carrying at least one of the (D) component and the (E) component on the carrier in the polymerization system.

Capable of being used is, for example, a method in which at least one of the (D) component and the (E) component and the carrier and, if necessary, the organic aluminum compound of the (F) component are added and in which olefin such as ethylene is added thereto at atmospheric pressure to 2 MPa (gauge) to carry out pre-polymerization at −20 to 200° C. for 1 minute to 2 hours to thereby produce catalyst particles.

A use proportion of the (E-1) component to the carrier in the catalyst used for producing the α-olefin polymer (a) used in the present invention is preferably 1:5 to 1:10000, more preferably 1:10 to 1:500 in terms of a mass ratio, and a use proportion of the (E-2) component to the carrier is preferably 1:0.5 to 1:1000, more preferably 1:1 to 1:50 in terms of a mass ratio.

When two or more kinds of the (E) components are used in a mixture, the use proportions of the respective (E) components to the carrier fall preferably in the ranges described above.

A use proportion of the (D) component to the carrier is preferably 1:5 to 1:10000, more preferably 1:10 to 1:500 in terms of a mass ratio.

In the α-olefin polymer (a) used in the present invention, a polymerization method shall not specifically be restricted, and any of a slurry polymerization method, a gas phase polymerization method, a bulk polymerization method, a solution polymerization method and a suspension polymerization method may be used. The slurry polymerization method and the gas phase polymerization method are particularly preferred.

In respect to the polymerization conditions, the polymerization temperature is usually −100 to 250° C., preferably −50 to 200° C. and more preferably 0 to 130° C.

A use proportion of the catalyst to the raw materials is preferably 1 to $10^8$, particularly preferably 100 to $10^5$ in terms of the raw material monomer/the (D) component (mole ratio).

The polymerization time is usually 5 minutes to 10 hours, and the polymerization pressure is preferably atmospheric pressure to 20 MPa (gauge), further preferably atmospheric pressure to 10 MPa (gauge).

In the production process of the α-olefin polymer (a) used in the present invention, hydrogen is preferably added since the polymerization activity is enhanced.

When using hydrogen, the pressure is usually atmospheric pressure to 5 MPa (gauge), preferably atmospheric pressure to 3 MPa (gauge) and further preferably atmospheric pressure to 2 MPa (gauge).

When using a polymerization solvent, capable of being used are, for example, aromatic hydrocarbons such as benzene, toluene, xylene and ethylbenzene, alicyclic hydrocarbons such as cyclopentane, cyclohexane and methylcyclohexane, aliphatic hydrocarbons such as pentane, hexane, heptane and octane and halogenated hydrocarbons such as chloroform and dichloromethane.

The above solvents may be used alone or in combination of two or more kinds thereof.

Also, monomers such as α-olefins may be used for the solvent.

The polymerization can be carried out in the absence of the solvent depending on the polymerization method.

In the polymerization, pre-polymerization can be carried out using the catalyst for polymerization described above. The pre-polymerization can be carried by bringing the solid catalyst component into contact with a small amount of olefin, but the method therefor shall not specifically be restricted, and publicly known methods can be used.

The olefin used for the pre-polymerization shall not specifically be restricted, and capable of being given are, for example, the same ones as those given previously as the examples, for example, ethylene, α-olefin having 3 to 20 carbon atoms and mixtures thereof. It is advantageous to use the same olefin as the olefin used in the above polymerization.

The pre-polymerization temperature is usually −20 to 200° C., preferably −10 to 130° C. and more preferably 0 to 80° C.

In the pre-polymerization, aliphatic hydrocarbons, aromatic hydrocarbons and monomers can be used for a solvent.

Among them, the aliphatic hydrocarbons are particularly preferred.

Also, the pre-polymerization may be carried out in the absence of the solvent.

In the pre-polymerization, the conditions are preferably controlled so that a limiting viscosity [η] (measured in decalin at 135° C.) of the pre-polymerization product is 0.1 deciliter/g or more and that an amount of the pre-polymerization product per 1 millimole of the transition metal component contained in the catalyst is 1 to 10000 g, particularly 10 to 1000 g.

A method for controlling a molecular weight of the polymer includes the kinds of the respective catalyst components, the use amounts, selection of the polymerization temperature and the polymerization under the presence of hydrogen.

Inert gas such as nitrogen may be allowed to be present.

Next, the petroleum wax (b) used in the present invention shall be explained.

The petroleum wax (b) used in the present invention shall not specifically be restricted as long as it has a melting point (Tm) which is higher by 10° C. or more than that of the higher α-olefin polymer (a), and various publicly known products can be used. Aliphatic, cyclic, linear and branched paraffin waxes which are suitably non-polar and microcrystalline waxes can be used, and polyolefins such as polyethylene having a melting point of 100 to 150° C. can be used as well.

Those having a melting point (Tm) which is higher by 10° C. or more than that of the higher α-olefin polymer (a) are used because the purpose of preparing the composition with the higher α-olefin polymer (a) is to provide a heat storage material which can meet a difference in temperature such as a difference in room temperature, that is, plural melting peaks have to be present.

The petroleum wax (b) preferably used includes paraffin waxes, and they include, for example, n-alkanes having 18 or more carbon atoms such as $C_{18}H_{38}$ and $C_{20}H_{42}$, 1-alkenes having 22 or more carbon atoms such as $C_{22}H_{44}$ and $C_{24}H_{48}$ and paraffin waxes such as 115° F. paraffin, No. 1 soft paraffin, 125° F. paraffin and 150° F. paraffin.

Further, waxes having narrow distribution such as refined paraffin waxes are more preferred from the viewpoint of preventing bleeding.

In the present invention, a melting point of the petroleum wax (b) is measured by a method for measuring usually a melting point of petroleum waxes. For example, JIS K-2235 is used in the case of paraffin waxes.

Next, the crystalline polyolefin (B) used in the present invention shall be explained.

The crystalline polyolefin (B) used in the present invention includes homopolymers of olefins or copolymers of two or more kinds of olefins.

The specific examples thereof include crystalline polypropylene (polypropylene base resins) such as homopolypropylene, propylene·α-olefin random copolymers and propylene·α-olefin block copolymers, crystalline polyethylene (polyethylene base resins) such as high density polyethylene, medium density polyethylene, high-pressure process low density polyethylene and linear low density polyethylene and crystalline polyolefins such as polybutene-1 and poly-4-methylpentene-1.

The α-olefin described above includes, for example, α-olefins having 2 to 20 carbon atoms such as ethylene, propylene, 1-butene, 1-pentene, 1-hexene, 4-methyl-1-pentene, 3-methyl-1-pentene, 1-octene, 3-methyl-1-butene, 1-decene, 1-dodecene, 1-tetradecene, 1-hexadecene, 1-octadecene and 1-eicosene and cyclic olefins having 3 to 20 carbon atoms such as cyclopentene, cycloheptene, norbornene, 5-ethyl-2-norbornene, tetracyclododecene and 2-ethyl-1,4,5,8-dimethano-1,2,3,4,4a,5,8,8a-octahydronaphthalene, and styrene, vinylcyclohexane and dienes can be given as well.

The polyolefin base resin (B) used in the present invention may contain in a proportion of 5 mole % or less, in addition to the structural units derived from the olefins described above, structural units derived from olefins having a branched structure such as 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, allylnaphthalene, allylnorbornane, styrene, dimethylstyrenes, vinylnaphthalenes, allyltoluenes, allylbenzene, vinylcyclohexane, vinylcyclopentane and vinylcycloheptane and structural units derived from diene compounds having 4 to 20 carbon atoms such as 1,3-butadiene, 1,3-pentadiene, 1,4-pentadiene, 1,3-hexadiene, 1,4-hexadiene, 1,5-hexadiene, 4-methyl-1,4-hexadiene, 5-methyl-1,4-hexadiene, 6-methyl-1,6-octadiene, 7-methyl-1,6-octadiene, 6-ethyl-1,6-octadiene, 6-propyl-1,6-octadiene, 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1,6-decadiene, 6-methyl-1,6-undecadiene, 1,7-octadiene, 1,9-decadiene, isoprene, butadiene, ethylidenenorbornene, vinylnorbornene and cyclopentadiene.

Among them, polymers comprising α-olefins having 2 to 6 carbon atoms as a principal structural unit are preferred as the polyolefin base resin (B) used in the present invention, and further preferred are polymers (ethylene base resins) comprising an ethylene unit as a principal structural element or polymers (propylene base resins) comprising a propylene unit as a principal structural element.

When the polyolefin base resin (B) is a polyethylene base resin, it is preferably a polymer containing a structural unit derived from ethylene in a proportion of 80 to 100 mole %, preferably 90 to 100 mole % and more preferably 94 to 100 mole % and a structural unit derived from olefin selected from olefins having 3 to 10 carbon atoms in a proportion of 0 to 20 mole %, preferably 0 to 10 mole % and more preferably 0 to 6 mole %.

When the polyolefin base resin (B) is a polypropylene base resin, it is preferably a polymer containing a structural unit derived from propylene in a proportion of 80 to 100 mole %, preferably 90 to 100 mole % and more preferably 92 to 100 mole %, a structural unit derived from ethylene in a proportion of 0 to 10 mole %, preferably 0 to 8 mole % and more preferably 0 to 6 mole % and a structural unit derived from olefin selected from olefins having 4 to 12 carbon atoms in a proportion of 0 to 15 mole %, preferably 0 to 10 mole % and more preferably 0 to 5 mole %.

When the polymer contains olefin other than the structural unit derived from propylene, it may be a random polymer or a block polymer.

When the polyolefin base resin (B) is a polypropylene base resin, a stereospecific ratio ([mm]) of a propylene chain part is 85 mole % or more, preferably 90 mole % or more and further preferably 95 mole % or more.

The polyolefin base resin (B) used in the present invention has preferably a melt index MI of 0.1 to 200 (g/10 minutes). It is more preferably 1 to 40 (g/10 minutes), further preferably 2 to 20 (g/10 minutes).

Further, the polyolefin base resin (B) has preferably a limiting viscosity [η] falling in a range of 0.5 to 10 dl/g, more preferably 1.5 to 3.5 dl/g.

Next, the elastomer (C) used in the present invention shall be explained.

Substances having a rubber-elastic property such as olefin base elastomers and styrene base thermoplastic elastomers can be given as the elastomer (C) used in the present invention.

The olefin base elastomers described above include, for example, elastomers obtained by copolymerizing α-olefins such as ethylene, propylene, 1-butene, 1-pentene and 1-octene or those called elastomers and plastomers obtained by copolymerizing them with cyclic olefins, styrene base monomers and non-conjugate dienes.

In general, polymers having a density of 0.91 $g/cm^3$ or less are called elastomers and plastomers, but they shall not be restricted by a density as long as they have a rubber-elastic property, and they may be chemically cross-linked or may not be chemically cross-linked.

Dicyclopentadiene, 1,4-hexadiene, dicyclooctadiene, methylenenorbornene and 5-ethylidene-2-norbornene can be given as the non-conjugate dienes described above.

Capable of being given as the olefin base elastomers described above are, to be specific, amorphous elastic copolymers comprising olefins as a principal component, such as ethylene•propylene copolymer elastomers, ethylene•1-butene copolymer elastomers, ethylene•propylene•1-butene copolymer elastomers, ethylene•1-hexene copolymer elastomers, ethylene•1-octene copolymer elastomers, ethylene•styrene copolymer elastomers, ethylene•norbornene copolymer elastomers, propylene•1-butene copolymer elastomers, ethylene•propylene•non-conjugate diene copolymer elastomers, ethylene•1-butene-non-conjugate diene copolymer elastomers and ethylene•propylene•1-butene•non-conjugate diene copolymer elastomers.

Among them, polymers comprising olefins having 2 to 8 carbon atoms as a principal structural unit are preferred, and copolymers comprising an ethylene unit as a principal structural unit are further preferred.

A melt flow rate (MFR) of the olefin base elastomers described above which is measured at 230° C. is 0.01 to 50 g/10 minutes, preferably 0.01 to 10 g/10 minutes and further preferably 0.01 to 5 g/10 minutes.

The olefin base elastomers described above include polypropylene and polybutene in which a stereospecificity is controlled.

In this case, the crystallinity is reduced by reducing the stereospecificity to reveal the rubbery elasticity, and polymers disclosed in Japanese Patent Application Laid-Open No. 172325/2001 and Japanese Patent Application Laid-Open No. 322213/2002 are given as the examples thereof.

The styrene base thermoplastic elastomers described above include block copolymers of styrene base compounds with conjugate diene compounds and hydrogenated products thereof.

The styrene base compounds described above include, for example, styrene, alkylstyrenes such as α-methylstyrene, p-methylstyrene and p-t-butylstyrene, p-methoxystyrene and vinylnaphthalene, and among them, styrene is preferred.

The conjugate diene compounds described above include, for example, butadiene, isoprene, piperylene, methylpentadiene, phenylbutadiene, 3,4-dimethyl-1,3-hexadiene and 4,5-diethyl-1,3-octadiene, and among them, butadiene and isoprene are preferred.

A molecular structure of the above styrene base thermoplastic elastomers may be any of linear, branched and radial ones and any combination thereof.

The styrene base thermoplastic elastomers described above include, to be specific, styrene•butadiene diblock copolymers, styrene•butadiene•styrene triblock copolymers, styrene•isoprene diblock copolymers, styrene•isoprene•styrene triblock copolymers, hydrogenated compounds of styrene•butadiene diblock copolymers, hydrogenated compounds of styrene•butadiene•styrene triblock copolymers, hydrogenated compounds of styrene•isoprene diblock copolymers and hydrogenated compounds of styrene•isoprene•styrene triblock copolymers.

The elastomer (C) used in the present invention may be used alone or in combination of two or more kinds thereof.

Further, other thermoplastic resins in addition to the crystalline polyolefin (B) and the elastomer (C) can also be blended as long as they do not run counter to the object of the present invention.

The thermoplastic resins include polar group-containing polyolefin base resins such as ethylene-unsaturated carboxylic acid ester copolymers and ethylene-carboxylic acid unsaturated ester copolymers, polystyrene base resins such as polystyrene, rubber-reinforced polystyrene (HIPS), isotactic polystyrene and syndiotactic polystyrene, polyacrylonitrile base resins such as acrylonitrile-styrene resins (AS) and acrylonitrile-butadiene-styrene resins (ABS), polymethacrylate base resins, polyamide base resins, polyester base resins, polycarbonate base resins, polyphenylene base resins, polyphenylene ether base resins, polyphenylene sulfide base resins, polyphenylene sulfone base resins, rosin base resins, terpene base resins, chroman•indene base resins and petroleum resins.

The thermoplastic resins may be used alone or in combination of two or more kinds thereof.

A production process of the heat storage material composition of the present invention shall not specifically be restricted, and it includes, for example, a method in which the heat storage material containing the side chain-crystalline polymer (A) is molten and kneaded with the crystalline polyolefin (B) and the elastomer (C) and a method in which the heat storage material containing the side chain-crystalline polymer (A), the crystalline polyolefin (B) and the elastomer (C) are dissolved in a common solvent and blended.

Methods which have so far been publicly known can widely be adopted as a method for melting and kneading the respective components described above.

A mixing roll, an intensive mixer, for example, a Banbury mixer, a kneader and a single shaft or double shaft extruding machine can be used as the melting and kneading equipment.

The heat storage material composition of the present invention can be further blended, if necessary, with fillers such as inorganic fillers and organic fillers which have so far been publicly known as long as the object of the present invention is not damaged.

The forms of the inorganic fillers and the organic fillers each described above shall not specifically be restricted, and any forms such as a granular form, a plate form, a bar form, a fiber form and a whisker form can be used.

Capable of being given as the inorganic fillers described above are, for example, oxides such as silica, diatomaceous earth, barium ferrite, alumina, titanium oxide, magnesium oxide, beryllium oxide, pumice and pumice balloon, hydroxides such as aluminum hydroxide, magnesium hydroxide and basic magnesium carbonate, carbonates such as calcium carbonate, magnesium carbonate, dolomite and dosonite, sulfates or sulfites such as calcium sulfate, barium sulfate, ammonium sulfate and calcium sulfite, clay minerals, silicates and organized compounds thereof (organized clays) such as talc, clay, mica, asbestos, glass fibers, glass flakes, glass balloons, glass beads, calcium silicate, montmorillonite, bentonite and kaolinite, carbons such as carbon black, graphite, carbon fibers and carbon hollow spheres, molybdenum sulfide, boron fibers, zinc borate, barium metaborate, calcium borate, sodium borate, magnesium oxysulfate and various metal fibers.

Capable of being given as the organic fillers described above are, for example, husk fibers of rice husk, wood flour, cotton, jute, paper narrow slips, cellophane pieces, aromatic polyamide fibers, cellulose fibers, nylon fibers, polyester fibers, polypropylene fibers and thermosetting resin powder.

The inorganic fillers and the organic fillers each described above may be used alone or in combination of two or more kinds thereof.

When injection-molding the heat storage material composition of the present invention, talc, mica, calcium carbonate and glass fibers are preferred, and talc is particularly preferred.

In respect to a size of talc, those having an average particle diameter of 1 to 8 μm and an average aspect ratio of 4 or more are preferred in terms of the physical properties of the resulting molded article such as a rigidity, an impact resistance, a scratching whitening resistance, weld appearance and uneven gloss.

In particular, those obtained by a processing crushing method are preferred in terms of physical properties and a rigidity.

A blending amount of the inorganic fillers and the organic fillers each described above falls in a range of 1 to 100 parts by weight per 100 parts by weight of the heat storage material composition of the present invention.

The above blending amount provides the molded article with a satisfactory rigidity and does not bring about inferior appearance such as weld appearance and uneven gloss, and it enhances an impact resistance and a scratching whitening resistance.

In terms of an appearance, a rigidity, an impact resistance and a scratching whitening resistance of the molded article, a preferred blending amount of the inorganic fillers and the organic fillers falls in a range of 3 to 60 parts by weight, particularly suitably 5 to 40 parts by weight per 100 parts by weight of the heat storage material composition.

Further, the heat storage material composition of the present invention can be blended, as long as the object of the present invention is not damaged, with additives which have so far been publicly known, such as crystal nucleus agents, weatherability stabilizers, UV absorbers, light stabilizing agents, heat resistance stabilizers, antistatic agents, mold releasing agents, flame retardants, synthetic oils, waxes, electric property-improving agents, slip inhibitors, anti-blocking agents, viscosity-controlling agents, coloring inhibitors, defogging agents, lubricants, pigments, dyes, plasticizers, softening agents, antiaging agents, hydrochloric acid-absorbing agents, chlorine scavengers and antioxidants.

A blending amount of the coloring agents described above is 5 parts by weight or less, preferably 3 parts by weight or less per 100 parts by weight of the total of the components of the heat storage material composition of the present invention, the inorganic fillers and the organic fillers in order to prevent the molded article from being reduced in a rigidity at high temperature and the cost from being elevated.

The stabilizing agents include, for example, phenol base stabilizing agents, organic phosphite base stabilizing agents, thioether base stabilizing agents, hindered amine base stabilizing agents and metal salts of higher fatty acids, and a blending amount thereof is usually 0.001 to 10 parts by weight per 100 parts by weight of the heat storage material composition of the present invention.

In the present invention, a method in which melting, kneading and pelletizing are carried out by means of, for example, a single shaft extruding machine, a double shaft extruding machine, a Banbury mixer, a kneader and a roll can be used as a method for blending the heat storage material composition of the present invention with the inorganic fillers and the organic fillers each described above and/or the respective various additives which are the desired components.

Further, a cross-linking agent for cross-linking the components of the heat storage material composition may be added.

The form of the heat storage material composition of the present invention shall not specifically be restricted and includes, for example, various forms such as a sheet form, a massive form and a granular form.

Among the above forms, the sheet form is particularly preferred, and it is preferably covered with a film of a polyethylene base resin, a polypropylene base resin and polyester.

The covered film described above includes a laminated film prepared by laminating the film described above with aluminum.

When molded into a fiber form, it is a fiber of a core-in-sheath type, wherein the heat storage material composition of the present invention is used preferably for a core part, and a thermoplastic resin is used preferably for a sheath part.

In this case, the thermoplastic resin used for the sheath part includes the crystalline polyolefin (B), the elastomer (C) and the other thermoplastic resins described above.

The core part is blended preferably with the resin used for the sheath part in terms of a processability and the physical properties of the resulting fiber.

EXAMPLES

Next, the present invention shall be explained in further details with reference to examples.

First, the evaluation methods of physical properties in production examples and examples shall be explained.

(a) DSC Measuring Method

Temperature defined as a peak top of a peak originating in a side chain-crystalline polymer, which was observed from a melting endothermic curve obtained by maintaining a sample at −30° C. for 5 minutes under nitrogen atmosphere by means of a differential scanning type calorimeter (DSC-7, manufactured by Perkin Elmer Co., Ltd.) and then heating it up to 190° C. at 10° C./minute was set as a melting point (TmD), and a melting heat amount calculated from an area of the peak was set as AHD (J/g). Further, temperature defined as a peak top originating in a side chain-crystalline polymer, which was observed from a melting endothermic curve obtained by maintaining the sample at 190° C. for 5 minutes, then cooling down to −30° C. at 5° C./minute, maintaining at −30° C. for 5 minutes and then heating up to 190° C. at 10° C./minute was set as a melting point (Tm), and a melting heat amount calculated from an area of the peak was set as ΔH (J/g).

A melting peak half band width Wm (° C.) was determined as a peak width in a middle point of a height from a base line to a peak top in the whole part of a melting peak in measuring Tm.

(b) GPC Measuring Method

Measured on the following conditions by means of the following equipment.

A polystyrene-reduced value determined from a calibration curve of standard polystyrene (PS) was used for measuring a weight average molecular weight (Mw), a number average molecular weight (Mn) and a molecular weight distribution (Mw/Mn).

Column: TOSO GMHHR—H(S)HT

Detector: RI detector WATERS 150 C for liquid chromatogram

Measuring temperature: 145° C.

Solvent: 1,2,4-trichlorobenzene

Sample concentration: 2.2 mg/ml (c) NMR Measuring Method

Measured by the method described in the present specification.

(d) Measuring Method of Wide-Angle X Ray Scattering Intensity Distribution

Measured by the method described in the present specification.

(e) Stickiness Measuring Method

The surface of the heat storage material composition was touched with a hand and marked with ○ for no stickiness, Δ for a little stickiness and X for heavy stickiness.

The heat storage material composition having no stickiness shows that the processability in molding is enhanced.

(f) Heat Decomposition Temperature Measuring Method

Measured by means of TGA (thermal gravity measuring apparatus) manufactured by Perkin Elmer Co., Ltd.

Temperature at which the weight was reduced by 20% was defined as the heat decomposition temperature, wherein measuring atmosphere was air, and a heating speed was set to 20° C./minute.

The higher temperature thereof shows that the thermal stability is high.

(g) Bleeding Property 1 Measuring Method

The heat storage material was put in a low density polyethylene film-made bag (thickness: 17 μm) and left standing in an oven of 80° C. for 8 hours, and then stickiness on the surface of the film bag was confirmed.

A case in which the heat storage material bled and in which the surface of the bag was sticky was marked with X, and a case in which the surface was not sticky was marked with ○.

(h) Bleeding Property 2 Measuring Method

The heat storage material was left standing in an oven of 80° C. for 8 hours and left cooling at room temperature, and then stickiness on the surface of the heat storage material was confirmed.

A case in which the heat storage material bled and in which the surface was sticky was marked with X; a case in which the surface was a little sticky was marked with Δ; and a case in which the surface was not sticky was marked with ○.

Production Example 1

Production of (1,2'-dimethylsilylene)(2,1'-dimethylsilylene)bis(3-trimethylsilylmethylindenyl)zirconium dichloride (1) Production of 2-chlorodimethylsilylindene A three neck flask of one liter was charged with 50 ml of THF (tetrahydrofuran) and 2.5 g (41 millimole) of magnesium under nitrogen flow, and 0.1 ml of 1,2-dibromoethane was added thereto, followed by stirring the solution for 30 minutes to activate magnesium.

After stirring, the solvent was removed, and 50 ml of fresh THF was added thereto.

A THF (200 ml) solution of 5.0 g (25.6 millimole) of 2-bromoindene was dropwise added thereto in 2 hours.

After finishing dropwise adding, the solution was stirred at room temperature for 2 hours and then cooled down to −78° C., and a THF (100 ml) solution of 3.1 ml (25.6 millimole) of dichlorodimethylsilane was dropwise added thereto in one hour. The solution was stirred for 15 hours, and then the solvent was distilled off.

The residue was extracted with 200 ml of hexane, and then the solvent was distilled off, whereby 6.6 g (24.2 millimole) of 2-chlorodimethylsilylindene was obtained (yield: 94%).

(2) Production of (1,2'-dimethylsilylene)(2,1'-dimethylsilylene)bis(indene)

A three neck flask of one liter was charged with 400 ml of THF and 8 g of 2-chlorodimethylsilylindene under nitrogen flow, and the solution was cooled down to −78° C.

A THF (1.0 mole/liter) solution 38.5 ml (38.5 millimole) of LiN(SiMe$_3$)$_2$ was dropwise added the above solution The solution was stirred at room temperature for 15 hours, and then the solvent was distilled off to extract the residue with 300 ml of hexane.

The solvent was distilled off, whereby 2.0 g (6.4 millimole) of (1,2'-dimethylsilylene)(2,1'-dimethylsilylene)bis(indene) was obtained (yield: 33.4%).

(3) Production of (1,2'-dimethylsilylene)(2,1'-dimethylsilylene)bis(3-trimethylsilylmethylindenyl)-zirconium dichloride A schlenk's bottle of 200 ml was charged with 2.5 g (7.2 millimole) of (1,2'-dimethylsilylene)-(2,1'-dimethylsilylene)bis(indene) and 100 ml of ether under nitrogen flow.

The solution was cooled down to −78° C., and 9.0 ml (14.8 millimole) of a hexane solution (1.6M) of n-butyllithium (n-BuLi) was added thereto and then stirred at room temperature for 12 hours.

The solvent was distilled off, and the resulting solid matter was washed with 20 ml of hexane and dried under reduced pressure, whereby a lithium salt was quantitatively obtained in the form of a white solid matter.

The lithium salt (6.97 millimole) of (1,2'-dimethylsilylene)(2,1'-dimethylsilylene)bis(indene) was dissolved in 50 ml of THF in the schlenk's bottle, and 2.1 ml (14.2 millimole) of iodomethyltrimethylsilane was slowly dropwise added thereto at room temperature and stirred for 12 hours.

The solvent was distilled off, and 50 ml of ether was added thereto, followed by washing the solution with a saturated ammonium chloride solution.

After separating the solution, the organic phase was dried, and the solvent was removed, whereby 3.04 g (5.9 millimole) of (1,2'-dimethylsilylene)(2,1'-dimethylsilylene)bis(3-trimethylsilylmethylindene). (Yield: 84%).

Next, a schlenk's bottle was charged with 3.04 g (5.9 millimole) of (1,2'-dimethylsilylene)(2,1'-dimethylsilylene)bis(3-trimethylsilylmethylindene) obtained above and 50 ml of ether under nitrogen flow.

The solution was cooled down to −78° C., and 7.4 ml (11.8 millimole) of a hexane solution (1.6M) of n-butyllithium (n-BuLi) was added thereto and then stirred at room temperature for 12 hours.

The solvent was distilled off, and the resulting solid matter was washed with 40 ml of hexane, whereby 3.06 g of a lithium salt was obtained in the form of an ether adduct.

$^1$H-NMR of the above compound was determined to obtain the following result.

$^1$H-NMR (900 MHz, THF-$d_8$): δ 0.04 (s, —SiMe$_3$, 18H), 0.48 (s, -Me$_2$Si—, 12H), 1.10 (t, —CH$_3$, 6H), 2.59 (s, —CH$_2$—, 4H), 3.38 (q, —CH$_2$—, 4H), 6.2 to 7.7 (m, Ar—H, 8H)

The lithium salt 3.06 g obtained above was suspended in 50 ml of toluene under nitrogen flow.

The suspension was cooled down to −78° C., and a toluene (20 ml) suspension of 1.2 g (5.1 millimole) of zirconium tetrachloride which was cooled in advance to −78° C. was dropwise added thereto. After dropwise adding, the suspension was stirred at room temperature for 6 hours.

The solvent in the reaction liquid was distilled off, and then the resulting residue was recrystallized from dichloromethane, whereby obtained was 0.9 g (1.33 millimole) of yellow fine crystal of (1,2'-dimethylsilylene)(2,1'-dimethylsilylene)bis(3-trimethylsilylmethylindenyl)zirconium dichloride (yield: 26%).

$^1$H-NMR of the above compound was determined to obtain the following result.

$^1$H-NMR (900 MHz, CDCl$_3$): δ 0.0 (s, —SiMe$_3$, 18H), 1.02, 1.12 (s, -Me$_2$Si—, 12H), 2.51 (dd, —CH$_2$—, 4H), 7.1 to 7.6 (m, Ar—H, 8H)

Example 1

Production of Higher α-Olefin Polymer Using α-Olefin Having 18 Carbon Atoms Making Use of the Catalyst Prepared in Production Example 1

An autoclave of 1 liter which was dried by heating was charged with 200 ml of heptane, 200 ml of 1-octadecene ($C_{18}$), 1.0 millimole of triisobutylaluminum and 1.0 millimole of methylaluminoxane, and 0.03 MPa of hydrogen was further introduced thereinto.

The temperature was controlled to 60° C. while stirring, and then added thereto was 1.0 micromole of (1,2'-dimethylsilylene)(2,1'-dimethylsilylene)bis(3-trimethylsilylmethylindenyl)zirconium dichloride obtained in Production Example 1 to carry out polymerization for 60 minutes.

After finishing the polymerization reaction, a reaction product was deposited by repeating reprecipitation operation with acetone, and it was dried by heating under reduced pressure, whereby 50.7 g of a higher α-olefin polymer was obtained.

The α-olefin polymer thus obtained had a melting point (Tm) of 41.2° C.

The measuring results of the physical properties of the polymer obtained are shown in Tables 1 to 3.

Example 2

Production of Higher α-Olefin Polymer Using α-Olefin Having 16 Carbon Atoms Making Use of the Catalyst Prepared in Production Example 1

An autoclave of 1 liter which was dried by heating was charged with 200 ml of heptane, 200 ml of 1-hexadecene ($C_{16}$), 1.0 millimole of triisobutylaluminum, 2.0 millimole of methylaluminoxane and 2 micromole of (1,2'-dimethylsilylene)(2,1'-dimethylsilylene)bis(3-trimethylsilylmethylindenyl)zirconium dichloride obtained in Production Example 1, and 0.05 MPa of hydrogen was further introduced thereinto to carry out polymerization at a polymerization temperature of 60° C. for 120 minutes.

After finishing the polymerization reaction, a reaction product was deposited with acetone, and then it was dried by heating under reduced pressure, whereby 81 g of a higher α-olefin polymer was obtained.

The α-olefin polymer thus obtained had a melting point (Tm) of 28.0° C.

The measuring results of the physical properties of the polymer obtained are shown in Tables 1 to 3.

Production Example 2

Production of Fixed Catalyst Component

A three neck flask having a content volume of 0.5 liter equipped with a stirrer was substituted with nitrogen gas and then charged with 80 ml of heptane subjected to dehydration treatment and 4.0 g (35 millimole) diethoxymagnesium.

The temperature was elevated up to 80° C., and then 13.2 millimole of di-n-butyl phthalate was added thereto.

This solution was maintained at 80° C., followed by adding thereto 116 ml (1.06 mole) of titanium tetrachloride, and it was stirred at an inner temperature of 110° C. for 2 hours to carry out carrying operation. Then, it was sufficiently washed with dehydrated heptane.

Further, 116 ml (1.06 mole) of titanium tetrachloride was added thereto, and the solution was stirred at an inner temperature of 110° C. for 2 hours to carry out the second carrying operation.

Then, it was sufficiently washed with dehydrated heptane to obtain a solid catalyst component (titanium carrying amount=1.21% by weight).

Example 3

Production of Higher α-Olefin Polymer Using α-Olefin Having 18 Carbon Atoms Making Use of the Catalyst Prepared in Production Example 2

An autoclave of 10 liter which was dried by heating was charged with 4000 ml of heptane, 4000 ml of 1-octadecene ($C_{18}$), 24.0 millimole of triisobutylaluminum and 1.2 millimole of dicyclopentyldimethoxysilane, and 0.8 MPa of hydrogen was further introduced thereinto.

The temperature was controlled to 80° C. while stirring, and then the fixed catalyst component obtained in Production Example 2 was added thereto in an amount of 160 micromole in terms of reduction to a Ti atom to carry out polymerization for 120 minutes.

After finishing the polymerization reaction, a reaction product was deposited by repeating reprecipitation operation with acetone, and it was dried by heating under reduced pressure, whereby 760.0 g of a higher α-olefin polymer was obtained.

The α-olefin polymer thus obtained had the melting points (Tm) of 26.2° C. and 67.1° C.

The measuring results of the physical properties of the polymer obtained are shown in Tables 1 to 3.

Comparative Example 1

The physical properties of Paraffin (melting point: 42 to 44° C., manufactured by Junsei Chemical Co., Ltd.) were measured, and the results thereof were shown in Table 3.

TABLE 1

| | Mw (PS-reduced value) | Mw/Mn | Tmd (° C.) | ΔHD (J/g) | Tm | ΔH (J/g) | Wm (° C.) | M2 (mole %) | M4 (mole %) | MR (mol %) | X1 (° C.) | X intensity ratio (%) |
|---|---|---|---|---|---|---|---|---|---|---|---|---|
| Example 1 | 130000 | 1.8 | 46.2 | 88.2 | 41.2 | 78.2 | 3.3 | 67.3 | 38.5 | 12.5 | 21 | 100 |
| Example 2 | 113000 | 1.8 | 23.0 37.7 | 76.1 | 28.0 | 64.4 | 4.9 | 69.8 | 42.2 | 11.2 | 20 | 100 |
| Example 3 | 290000 | 4.4 | 37.4 70.8 | 111.9 | 26.2 67.1 | 106 | 8.4 | 94.1 | 88.2 | 1.9 | 20.5 23.1 | 86.4 13.6 |

TABLE 2

T1 (ms) at respective temperatures by measuring solid NMR

| | ° C. | | | | | | | | | | | | |
|---|---|---|---|---|---|---|---|---|---|---|---|---|---|
| | 20 | 25 | 30 | 35 | 40 | 45 | 50 | 55 | 60 | 65 | 70 | 75 | 80 |
| Example 1 | | | 193 | 193 | 127 | 84 | 87 | | | | | | |
| Example 2 | | 115 | 101 | 89 | 81 | | | | | | | | |
| Example 3 | 245 | 241 | 240 | 222 | 220 | 214 | 222 | 220 | 214 | 208 | 78 252 | 87 300 | 91 350 |

TABLE 3

| | Stickiness | Heat decomposition temperature (° C.) | Bleeding property 1 |
|---|---|---|---|
| Example 1 | ○ | 396 | ○ |
| Example 2 | Δ | 383 | ○ |
| Example 3 | Δ | 370 | ○ |
| Comparative Example 1 | X | 290 | X |

Examples 4 to 6 and Comparative Example 2

Compositions shown in Table 4 were dissolved and mixed in xylene while heating at 140° C.

A homogeneous solution thus obtained was thrown into methanol to deposit a solid matter, and the resulting powder was dried under vacuum. Then, a plate of 3 cm square having a thickness of 2 mm was prepared by melt press molding at 190° C. to evaluate characteristics thereof, and the results thereof are shown in Table 4.

Examples 7 to 9

Compositions shown in Table 5 were molten and mixed using Paraffin Wax 150 (Tm: 66° C.) manufactured by Nippon Seiro Co., Ltd. while heating at 90° C.

The composition obtained was used to prepare a plate of 3 cm square having a thickness of 2 mm by melt press molding at 100° C. The characteristics thereof were evaluated, and the results thereof are shown in Table 5.

TABLE 5

| | | Example 7 | Example 8 | Example 9 |
|---|---|---|---|---|
| Composition (weight part) | Polymer of Example 1 | 100 | 100 | 100 |
| | Paraffin 150 | 25 | 100 | 400 |
| Tm (° C.) | | 40.8 60.2 | 39.8 65.5 | 37.9 67.3 |
| ΔH (J/g) | | 112.0 | 139.6 | 176.3 |
| Stickiness | | ○ | ○ | Δ |

TABLE 4

| | | Example 4 | Example 5 | Example 6 | Comparative Example 2 |
|---|---|---|---|---|---|
| Composition (wt %) | Polymer of Example 1 | 80 | — | — | — |
| | Polymer of Example 2 | — | 80 | — | — |
| | Polymer of Example 3 | — | — | 85 | — |
| | Paraffin (melting point: 42 to 44° C.) | — | — | — | 80 |
| | LLDPE (*1) | 20 | 20 | 10 | 20 |
| | Ethylene base elastomer (*2) | — | — | 5 | — |
| | Tm (° C.) | 41.6 | 28.6 | 28.6 71.7 | 27.3 41.6 48.3 |
| | ΔH (J/g) | 62.2 | 51.0 | 89.8 | 77.6 |
| Bleeding property 2 | | ○ | ○ | Δ | X |

(*1): MORETEC 1018CN, linear low density polyethylene, manufactured by Idemitsu Petrochemical Co., Ltd.
(*2): Engage 8150, manufactured by Du Pont Dow Elastomer Co., Ltd.

In Examples 7 to 9, the heat storage temperature can be handled as capable of controlling the temperature in two ways of 40° C. and 65° C. if heated to 70° C. or higher, and the heat storage temperature can be handled as 40° C. if heated at 50° C. In such case, the heat storage amount is decreased, and a rise in the temperature in the state that the ambient temperature is high can be avoided.

That is, an effect on room temperature controlling by a difference in the ambient temperature can be avoided by controlling the heat storage amount.

Example 10

Production of Higher α-Olefin Polymer Using α-Olefin Having 16 to 18 Carbon Atoms Making Use of the Catalyst Prepared in Production Example 1

An autoclave of 1 liter which was dried by heating was charged with 96 ml of 1-hexadecene (Linearen 16, manufactured by Idemitsu Kosan Co., Ltd.), 304 ml of 1-octadecene (Linearen 18, manufactured by Idemitsu Kosan Co., Ltd.) and 0.5 millimole of triisobutylaluminum, and the temperature was controlled to 60° C. while heating. Then, added thereto were 1.0 micromole of (1,2'-dimethylsilylene)(2,1'-dimethylsilylene)bis(3-trimethylsilylmethylindenyl)zirconium dichloride obtained in Production Example 1 and 4.0 micromole of dimethylaniliumtetrakispentafluorophenyl borate, and 0.05 MPa of hydrogen was further introduced thereinto to carry out polymerization for 120 minutes.

After finishing the polymerization reaction, a reaction product was deposited by repeating reprecipitation operation with acetone, and then it was dried by heating under reduced pressure, whereby 186.1 g of a higher α-olefin polymer was obtained.

The measuring results of the physical properties of the polymer obtained are shown in Tables 6 to 8.

Example 11

Polypropylene (J-2000GP, manufactured by Idemitsu Kosan Co., Ltd.) and the higher α-olefin polymer obtained in Example 10 were molten and kneaded in a proportion of 70/30. Mixing was carried out at a temperature of 230° C. by means of a plastomill manufactured by Toyo Seiki Seisaku-sho, Ltd.

The mixture obtained was used to prepare a plate of 3 cm square having a thickness of 2 mm by melt press molding at 220° C.

The bleeding property 2 was ranked to ○ (the surface was not sticky).

The above plate was sufficiently left standing under the atmosphere of 40° C. and then put on a stainless plate cooled to 0° C. to measure a change in a surface temperature of this plate with the passage of time, and the results thereof are shown in Table 9.

Comparative Example 3

Polypropylene (J-2000GP, manufactured by Idemitsu Kosan Co., Ltd.) was used to prepare a plate of 3 cm square having a thickness of 2 mm by melt press molding at 220° C.

The above plate was sufficiently left standing under the atmosphere of 40° C. and then put on a stainless plate cooled to 0° C. to measure a change in a surface temperature of this plate with the passage of time, and the results thereof are shown in Table 9.

It can be found from the results that heat stored in the material containing the higher α-olefin polymer was discharged to prevent the temperature from being lowered.

That is, it is expected that if such material is used for clothes, an environmental change (reduction in the temperature) in the inside of the clothes is reduced when the environment is changed from warmness to coldness and that the comfort is enhanced.

TABLE 6

| | Mw (PS-reduced value) | Mw/Mn | Tmd (° C.) | ΔHD (J/g) | Tm (° C.) | ΔH (J/g) | Wm (° C.) | M2 (mole %) | M4 (mole %) | MR (mole %) | X1 (° C.) | X intensity ratio (%) |
|---|---|---|---|---|---|---|---|---|---|---|---|---|
| Example 10 | 110000 | 1.8 | 38.2 | 76.4 | 36.0 | 80.3 | 3.3 | 60.1 | 28.1 | 16.1 | 21 | 100 |

TABLE 7

T1 (ms) at respective temperatures by measuring solid NMR

| | ° C. | | | | |
|---|---|---|---|---|---|
| | 25 | 30 | 35 | 40 | 45 |
| Example 10 | 180 | 175 | 132 | 118 | 85 |

TABLE 8

| | Stickiness | Heat decomposition temperature (° C.) | Bleeding property 1 |
|---|---|---|---|
| Example 10 | ○ | 362 | ○ |

TABLE 9

| | Time (second) | | | |
|---|---|---|---|---|
| | 30 | 60 | 90 | 120 |
| Example 11 | 34.0 | 32.0 | 30.3 | 28.5 |
| Comparative Example 3 | 33.6 | 28.9 | 25.9 | 24.0 |

INDUSTRIAL APPLICABILITY

As explained above, a side chain-crystalline polymer is used for a heat storage material in the heat storage material composition of the present invention, thereby resulting in a heat storage material composition which is less sticky and inhibited from being decomposed and vaporized at high temperature and which is decreased in bleeding and has a large melting heat capacity. Further, the heat storage material composition is not fragile at a melting point thereof or lower and therefore has good workability and processability.

If plural melting points are obtained by combining a side chain-crystalline polymer with petroleum wax in which a melting point (Tm) is higher by 10° C. or more than that of the above polymer as raw materials for the heat storage material, different heat releasing temperatures at a high temperature side or a low temperature side can be set up based on the characteristic thereof, and it becomes possible to meet a change in temperature such as a difference in room temperature at the temperature set up and to avoid a heating state deviated to high temperature or low temperature.

The heat storage material composition of the present invention is useful as a material which is used for heating or keeping warmth in building structures, baths and bath rooms, table wares, hair curlers and fibers and cloths for dresses, and handles of cars, interior materials for dashboards and the like, electronic materials and inner walls of refrigerators to prevent a sudden rise in temperatures thereof, and which can be used for dresses, bedclothes and protective means such as masks to provide the users thereof with a sensation of coolness.

What is claimed is:

1. A heat storage material composition comprising:
   20 to 100% by weight of a heat storage material,
   80 to 0% by weight of a crystalline polyolefin (B), and
   50 to 0% by weight of an elastomer (C),
   wherein
   the heat storage material comprises a side chain-crystalline polymer (A) that is a higher α-olefin polymer (a) comprising 50 mole % or more of α-olefin having 10 or more carbon atoms, and
   the higher α-olefin polymer (a) is obtained by polymerization of one or more of the α-olefins having 10 or more carbon atoms.

2. The heat storage material composition as described in claim 1, wherein the heat storage material comprises the higher α-olefin polymer (a) comprising 50 mole % or more of higher α-olefin having 10 or more carbon atoms and a petroleum wax (b) in which a melting point (Tm) is higher by 10° C. or more than that of the polymer (a).

3. The heat storage material composition as described in claim 2, wherein the higher α-olefin polymer (a) satisfies the following (1) to (3):
   (1) a stereospecific index value M2 (mole %) is 50 mole % or more,
   (2) a weight average molecular weight (Mw) reduced to polystyrene which is measured by gel permeation chromatograph (GPC) is 1,000 to 10,000,000, and a molecular weight distribution (Mw/Mn) is 1.2 to 4.0 and
   (3) a peak observed from a melting endothermic curve obtained by maintaining the above polymer at 190° C. for 5 minutes under nitrogen atmosphere by means of a differential scanning type calorimeter (DSC), then cooling down to −30° C. at 5° C./minute, maintaining at −30° C. for 5 minutes and then heating up to 190° C. at 10° C./minute is single, and a melting heat amount (ΔH) calculated from an area of the peak is 30 (J/g) or more.

4. The heat storage material composition as described in claim 2, wherein the higher α-olefin polymer (a) satisfies at least one of the following (4a) to (4c):
   (4a) a peak observed from a melting endothermic curve obtained by maintaining the above polymer at 190° C. for 5 minutes under nitrogen atmosphere by means of a differential scanning type calorimeter (DSC), then cooling down to −30° C. at 5° C./minute, maintaining at −30° C. for 5 minutes and then heating up to 190° C. at 10° C./minute is single, and a melting point (Tm) at a peak top thereof is 20 to 100° C.,
   (4b) in measurement of spin-lattice relaxation time (T1) by solid NMR measurement, single T1 is observed in the melting point (Tm) or higher and
   (4c) observed is a single peak X1 originating in side chain crystallization observed at 15 deg<2θ<30 deg in measurement of wide-angle X ray scattering intensity distribution.

5. The heat storage material composition as described in claim 2, wherein the higher α-olefin polymer (a) satisfies the following (5):
   (5) a half band width (Wm) observed from a melting endothermic curve obtained by means of a differential scanning type calorimeter (DSC) is 10° C. or lower.

6. The heat storage material composition as described in claim 2, wherein the higher α-olefin polymer (a) is obtained by polymerizing higher α-olefin in the presence of a catalyst for polymerization containing at least one kind of a component selected from:
   (D) a transition metal compound represented by the following Formula (I),
   (E) (E-1) a compound which can form an ionic complex by reacting with the transition metal compound of the above component (D) or a derivative thereof and
   (E-2) aluminoxane:

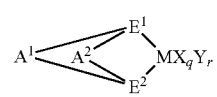

(I)

wherein M represents a metal element of the 3rd to 10th group in the periodic table or a lanthanoid series; $E^1$ and $E^2$ each represent a ligand selected from a substituted cyclopentadienyl group, an indenyl group, a substituted indenyl group, a heterocyclopentadienyl group, a substituted heterocyclopentadienyl group, an amide group, a phosphide group, a hydrocarbon group and a silicon-containing group, and they form a cross-linking structure via $A^1$ and $A^2$ and may be the same as or different from each other; X represents an α-bonding ligand, and when plural X's are present, plural X's may be the same or different and may be cross-linked with other X, $E^1$, $E^2$ or Y; Y represents a Lewis base, and when plural Y's are present, plural Y's may be the same or different and may be cross-linked with other Y, $E^1$, $E^2$ or X; $A^1$ and $A^2$ are divalent cross-linking groups bonding two ligands and represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —$SO_2$—, —Se—, —$NR^1$—, —$PR^1$—, —$P(O)R^1$—, —$BR^1$— or —$AlR^1$—; $R^1$ represents a hydrogen atom, a halogen atom, a hydrocarbon group having 1 to 20 carbon atoms or a halogen-containing hydrocarbon group having 1 to 20 carbon atoms, and they may be the same as or different from each other; q is an integer of 1 to 5 and represents [(valence of M)−2], and r represents an integer of 0 to 3.

7. The heat storage material composition as described in claim 1, wherein the crystalline polyolefin (B) is at least one selected from a polyethylene base resin and a polypropylene base resin.

8. The heat storage material composition as described in claim 1, wherein the elastomer (C) is at least one selected from an olefin base elastomer and a styrene base thermoplastic elastomer.

* * * * *

UNITED STATES PATENT AND TRADEMARK OFFICE
CERTIFICATE OF CORRECTION

| | | |
|---|---|---|
| PATENT NO. | : 7,714,081 B2 | Page 1 of 1 |
| APPLICATION NO. | : 10/577496 | |
| DATED | : May 11, 2010 | |
| INVENTOR(S) | : Sera et al. | |

It is certified that error appears in the above-identified patent and that said Letters Patent is hereby corrected as shown below:

On the title page, the Terminal Disclaimer information has been omitted. Item (45) and the Notice information should read as follows:

Item --(45) **Date of Patent: *May 11, 2010**

(*) Notice: Subject to any disclaimer, the term of this
               patent is extended or adjusted under 35
               U.S.C. 154(b) by 428 days.

This patent is subject to a terminal disclaimer.--

Signed and Sealed this

Thirteenth Day of July, 2010

David J. Kappos
*Director of the United States Patent and Trademark Office*